(12) United States Patent
Nilson

(10) Patent No.: US 9,730,380 B2
(45) Date of Patent: Aug. 15, 2017

(54) APPARATUS FOR SEPARATING DEBRIS FROM USABLE CROP

(71) Applicant: Crary Industries, Inc., West Fargo, ND (US)

(72) Inventor: Michael A. Nilson, West Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 14/630,723

(22) Filed: Feb. 25, 2015

(65) Prior Publication Data

US 2016/0057936 A1    Mar. 3, 2016

Related U.S. Application Data

(60) Provisional application No. 62/043,817, filed on Aug. 29, 2014.

(51) Int. Cl.
| | |
|---|---|
| A01D 46/00 | (2006.01) |
| A01D 33/08 | (2006.01) |
| B07B 4/00 | (2006.01) |
| B07B 11/06 | (2006.01) |
| B07B 4/08 | (2006.01) |

(52) U.S. Cl.
CPC ............... *A01D 33/08* (2013.01); *B07B 4/00* (2013.01); *B07B 4/08* (2013.01); *B07B 11/06* (2013.01)

(58) Field of Classification Search
CPC .. B07B 4/00; B07B 13/00; B07B 9/00; A01D 33/08; A01D 33/10
USPC ...... 171/17, 14, 130, 23, 138; 209/147, 154, 209/137, 139.1, 136, 44.2, 32, 34, 643; 56/DIG. 8, 328.1; 460/143; 15/309.2, 15/316.1
See application file for complete search history.

(56) References Cited

U.S. PATENT DOCUMENTS

| | | | | |
|---|---|---|---|---|
| 1,418,476 A | * | 6/1922 | Schaefer | ............... A01D 41/08 56/1 |
| 1,975,668 A | | 10/1934 | Rodin | |
| 2,209,282 A | | 7/1940 | Rodin | |
| 2,294,086 A | * | 8/1942 | Hinds | .................... A01D 46/02 209/139.1 |
| 2,448,446 A | | 8/1948 | La Pointe | |
| 2,458,224 A | | 1/1949 | Thompson | |
| 2,558,894 A | | 7/1951 | Wright | |
| 2,579,957 A | * | 12/1951 | Pearne | .................. A01D 41/06 56/123 |
| 2,612,993 A | | 10/1952 | Levesque | |

(Continued)

*Primary Examiner* — Árpád Fábián-Kovács
(74) *Attorney, Agent, or Firm* — Wood, Phillips, Katz, Clark & Mortimer

(57) ABSTRACT

An apparatus for separating usable crop from intermixed debris. The apparatus has: a) a conveying system configured to convey usable crop in a processing path from an upstream input location to a downstream output location; and b) a first separating system configured to cause separation of debris intermixed with usable crop as usable crop is conveyed in the processing path. A vacuum system downstream of the preliminary separating system is configured to: a) generate a low pressure volume which causes additional debris intermixed with usable crop to be drawn away from usable crop by vacuum; and b) cause drawn debris to be directed towards a collection location spaced from the output location while allowing usable crop to advance toward the output location.

25 Claims, 18 Drawing Sheets

(56) References Cited

U.S. PATENT DOCUMENTS

| | | | | |
|---|---|---|---|---|
| 2,653,712 A * | 9/1953 | Leighton | ................ | A01D 33/04 209/135 |
| 2,657,798 A | 11/1953 | Young | | |
| 2,703,953 A | 3/1955 | Altemus | | |
| 2,717,076 A * | 9/1955 | Leighton | ................ | A01D 17/00 209/138 |
| 2,717,077 A | 9/1955 | Leighton et al. | | |
| 2,724,226 A | 11/1955 | Askviken et al. | | |
| 2,997,172 A | 8/1961 | Wright | | |
| 3,107,475 A * | 10/1963 | Gustafson | .............. | A01D 51/00 171/17 |
| 3,193,020 A | 7/1965 | Button | | |
| 3,227,276 A * | 1/1966 | Leighton | ................ | A01D 33/08 171/14 |
| 3,273,712 A | 9/1966 | Spafford | | |
| 3,428,172 A | 2/1969 | Hoffman | | |
| 3,429,438 A | 2/1969 | Palmen et al. | | |
| 3,442,379 A | 5/1969 | Schneider et al. | | |
| 3,469,691 A * | 9/1969 | Boyce | .................... | A01D 33/08 171/17 |
| 3,471,013 A | 10/1969 | Haver | | |
| 3,596,716 A | 8/1971 | Hoffman | | |
| 3,628,316 A * | 12/1971 | Rea, Sr. | ................. | A01D 45/02 56/119 |
| 3,628,609 A * | 12/1971 | Graybill | ............... | A01D 45/006 171/14 |
| 3,630,355 A * | 12/1971 | Christensen | ......... | A01D 51/002 209/137 |
| 3,788,048 A * | 1/1974 | Stiff | ....................... | B01D 45/14 209/250 |
| 3,854,585 A * | 12/1974 | Herkes | ...................... | B07B 9/02 209/3.1 |
| 3,946,875 A * | 3/1976 | Fowler | ..................... | B07B 4/06 209/134 |
| 4,174,001 A * | 11/1979 | Ellis | ....................... | A01D 33/08 171/17 |
| 4,235,293 A * | 11/1980 | Ellis | ........................ | F04D 29/70 171/17 |
| 4,364,222 A * | 12/1982 | Ramacher | ............ | A01D 51/002 209/139.1 |
| 4,392,533 A | 7/1983 | Bittle | | |
| 4,861,464 A | 8/1989 | Zaltzman et al. | | |
| 4,865,722 A | 9/1989 | Ririe et al. | | |
| 4,929,342 A * | 5/1990 | Johnston | ................. | B03B 9/061 209/137 |
| 4,971,594 A | 11/1990 | Gallenberg | | |
| 5,042,240 A * | 8/1991 | Rocca | .................... | A01D 46/00 198/516 |
| 5,301,811 A * | 4/1994 | Mueller | ..................... | B07B 9/02 209/44.2 |
| 7,322,424 B2 | 1/2008 | Kido | | |
| 7,412,817 B2 * | 8/2008 | Flora | ..................... | A01D 51/002 56/328.1 |
| 7,581,375 B2 * | 9/2009 | Meester | ............... | A01D 45/006 56/327.1 |
| 7,789,166 B2 | 9/2010 | Wallace | | |
| 8,123,598 B2 * | 2/2012 | Berthet | ................ | A01D 46/285 460/144 |
| 9,119,346 B2 * | 9/2015 | Vergote | .................. | A01D 45/10 |
| 2005/0229576 A1 * | 10/2005 | Flora | .................... | A01D 51/002 56/328.1 |
| 2007/0000224 A1 * | 1/2007 | Meester | ............... | A01D 45/006 56/327.1 |
| 2009/0056297 A1 * | 3/2009 | Pellenc | .................. | A23N 15/02 56/330 |
| 2009/0124309 A1 * | 5/2009 | Redekop | ............... | A01D 45/02 460/100 |
| 2010/0132326 A1 * | 6/2010 | Berthet | ................ | A01D 46/285 56/328.1 |
| 2014/0144118 A1 * | 5/2014 | Le Neve | ............. | A01D 46/285 56/328.1 |

* cited by examiner

APPARATUS FOR SEPARATING DEBRIS FROM USABLE CROP

CROSS-REFERENCE TO RELATED APPLICATIONS

This application claims priority to U.S. Provisional Patent Application No. 62/043,817 filed Aug. 29, 2014.

BACKGROUND OF THE INVENTION

Field of the Invention

This invention relates to crop harvesting and, more particularly, to an apparatus through which usable crop can be separated from debris such as dirt, rocks, vines, corn stalks, crowns, etc. This invention is also directed to a method of using such an apparatus.

Background Art

Efficient and effective separation of a usable crop from field debris remains an ongoing challenge in the agricultural industry. Apparatus used for crop separation are generally developed with the following design objectives: a) maximum separation of debris from usable crop while minimizing crop damage; b) accommodating different types of debris that might be encountered in different geographical areas and with different field makeups—namely, dirt and clay, small and potentially large rocks, vines, corn stalks, crowns, etc.; c) accumulating separated debris in a controlled manner so that staged debris can be appropriately handled after a field operation is concluded, as by onsite disposal or relocation; d) providing an overall system that is affordable to users with a range of different volume requirements; e) providing an overall system that has components capable of being transported to different sites, as within a user's field and between fields using public right-of-ways; and f) providing an overall system that can be easily and efficiently operated by a limited number of personnel in a manner that is safe for the operators and so that there is a minimal impact on the environment around the system.

Many existing systems have been designed that focus on one or more of the above objectives. However, after many decades of evolution, improvements remain necessary. This is particularly the case since competition challenges all in the agricultural industry to effect crop separation more effectively and efficiently while controlling overall operational costs.

Some of the specific design challenges can be identified relative to the harvesting of potatoes. Mixed potatoes and debris that are delivered for separation may contain: a) dirt, sand, clay, etc., that may be in different forms with different consistencies and adhered to the potatoes with different tenacity; b) vines; and c) rocks of different size, shape, and composition, with sizes ranging from small pebbles to large boulders. Conventional systems generally are not capable of accommodating all different types of debris and, as a result, generally either the fully processed crop remains intermixed with a significant amount of debris and/or system operators must manually perform steps during the separation process to maximize results. The latter may necessitate interruption of the processing, which compromises efficiency.

Systems not equipped to accommodate certain types of debris, such as large boulders, may become jammed or, in a worst case, damaged during normal operations. In either case, processing may be interrupted for potentially significant time periods to allow the problems to be alleviated. Undue progressive wear may lead to more regular maintenance and potentially extensive repairs.

Certain prior systems have utilized pressurized fluid and vacuum to reposition crop and debris during a separation process. These systems create their own inherent challenges, particularly integrating the same with conventional separation components. Further, such systems entrain dust particles in the air around the system which must be controlled to create a safe environment for operators and also allow an appropriate accumulation and/or disposal.

The challenges to equipment designers in the agricultural industry continue to even a greater extent to this day.

SUMMARY OF THE INVENTION

In one form, the invention is directed to an apparatus for separating usable crop from intermixed debris. The apparatus consists of: a conveying system configured to convey usable crop in a processing path from an upstream input location to a downstream output location; a first separating system configured to cause separation of debris intermixed with usable crop as usable crop is conveyed in the processing path; and a vacuum system downstream of the first separating system and configured to: a) generate a low pressure volume which causes additional debris intermixed with usable crop to be drawn away from usable crop by vacuum; and b) cause drawn debris to be directed towards a collection location spaced from the output location while allowing usable crop to advance toward the output location.

In one form, the conveying system has a plurality of cooperating, independently operating, conveying sections.

In one form, the first separating system has a plurality of cooperating shafts, each with radially projecting fingers, that rotate around axes substantially normal to the conveying path. The shafts and fingers are configured to: a) break loose debris intermixed with conveying usable crop; and b) permit travel of broken loose debris downwardly to between the shafts and out of the processing path.

In one form, the apparatus further includes an auxiliary conveyor configured to intercept downwardly traveling debris and convey intercepted downwardly traveling debris towards a collection location.

In one form, the first separating system includes a reconfigurable conveying section. The reconfigurable conveying section has an endless conveying component moving around roller support assemblies so as to define an upwardly facing conveying surface. At least one of the roller support assemblies is configured to move in response to the application of a predetermined downward force applied upon the upwardly facing conveying surface as an incident of which an orientation of at least a portion of the upwardly facing surface is changed.

In one form, the vacuum system has a housing defining a chamber through which the processing path extends, and in which the low pressure volume is generated. The housing defines an inlet through which the processing path extends.

In one form, the reconfigurable conveying section is configured to cause debris to be conveyed out of the processing path towards a collection location.

In one form, the reconfigurable conveying section has: a) a first state that is maintained without a downward force equal to or greater than the predetermined downward force applied to the endless conveying component; and b) a second state in which the at least one roller support is moved in response to the application of the predetermined downward force to the endless conveying component.

In one form, the vacuum system has a housing defining a chamber through which the processing path extends, and in which the low pressure volume is generated. The housing defines an inlet to the chamber. The reconfigurable conveying section and vacuum system are configured so that usable crop is drawn by vacuum generated at the housing inlet away from the upwardly facing conveying surface on the reconfigurable conveying section and through the housing inlet and into the chamber.

In one form, the reconfigurable conveying section is configured so that the upwardly facing conveying surface on the reconfigurable conveying section inclines at an angle towards the housing inlet.

In one form, one of the roller support assemblies is configured to be moved to thereby change the angle of incline.

In one form, one of the roller support assemblies is configured to be moved to thereby change a relationship between the upwardly facing conveying surface and the housing inlet.

In one form, the vacuum system has an evacuating system that is operable to create the low pressure volume in the housing chamber. A collection container is provided between the evacuating system and the housing volume. The collection container has a space within which low pressure is generated by the evacuating system. The low pressure in the collection container space causes debris separated from usable crop in the housing chamber to move into the collection container space.

In one form, the vacuum system further includes a conduit that is configured so that debris moving from the housing chamber into the collection container space travels downwardly towards the collection container space.

In one form, the collection container has spaced first and second openings. The first opening receives debris from the housing chamber. The second opening is in communication with the evacuating system. The collection container has a floor upon which debris is progressively accumulated. The first and second openings each is spaced above the floor so that a substantial height of debris can be accumulated upon the floor without obstructing the first or second openings.

In one form, the vacuum system has a housing that defines a chamber through which the processing path extends and in which the low pressure volume is generated. The conveying system, preliminary separating system and housing make up a unit that is supported on a wheeled carriage to facilitate transportation thereof to and from a site at which the apparatus is used.

In one form, the evacuating system is configured to be separable from the collection container. The evacuating system is supported on a wheeled carriage to facilitate transportation thereof to and from a site at which the apparatus is used.

In one form, the housing has a top opening. The vacuum system has an evacuation system that is in communication with the top opening. The housing has a wall surface bounding the chamber that is inclined between the housing inlet and the top opening.

In one form, the housing has a top opening. The vacuum system has an evacuation system that is in communication with the top opening. The housing has a wall surface bounding the chamber that converges to the top opening.

In one form, the invention is directed to a method of separating usable crop from intermixed debris. The method includes the steps of: providing the apparatus described above; placing usable crop intermixed with debris comprising dirt, vines, and rocks on the conveying system at the input location, so that the usable crop intermixed with debris is conveyed in the processing path; through the first separating system, separating certain debris from the usable crop; through the vacuum system separating additional debris from the usable crop and directing the additional debris to a separate container in which the additional debris is accumulated; and collecting the usable crop after the additional debris has been separated.

In one form, the step of separating certain debris consists of separating large debris at a first location in the processing path by advancing the large debris off of an end of a conveyor and out of the processing path and separating other debris at a second location in the processing path spaced from the first location.

In one form, the method further includes the step of using an evacuating system in the vacuum system to generate the low pressure volume by evacuating the container space and space within a conduit communicating between the container space and housing volume.

In one form, the apparatus has first and second conveying sections that advance usable crop in the processing path in different directions. The method further includes the step of using the vacuum system to cause crop advancing in the processing path to move from the first conveying section to the second conveying section.

DETAILED DESCRIPTION OF THE PREFERRED EMBODIMENT

Figure 1:
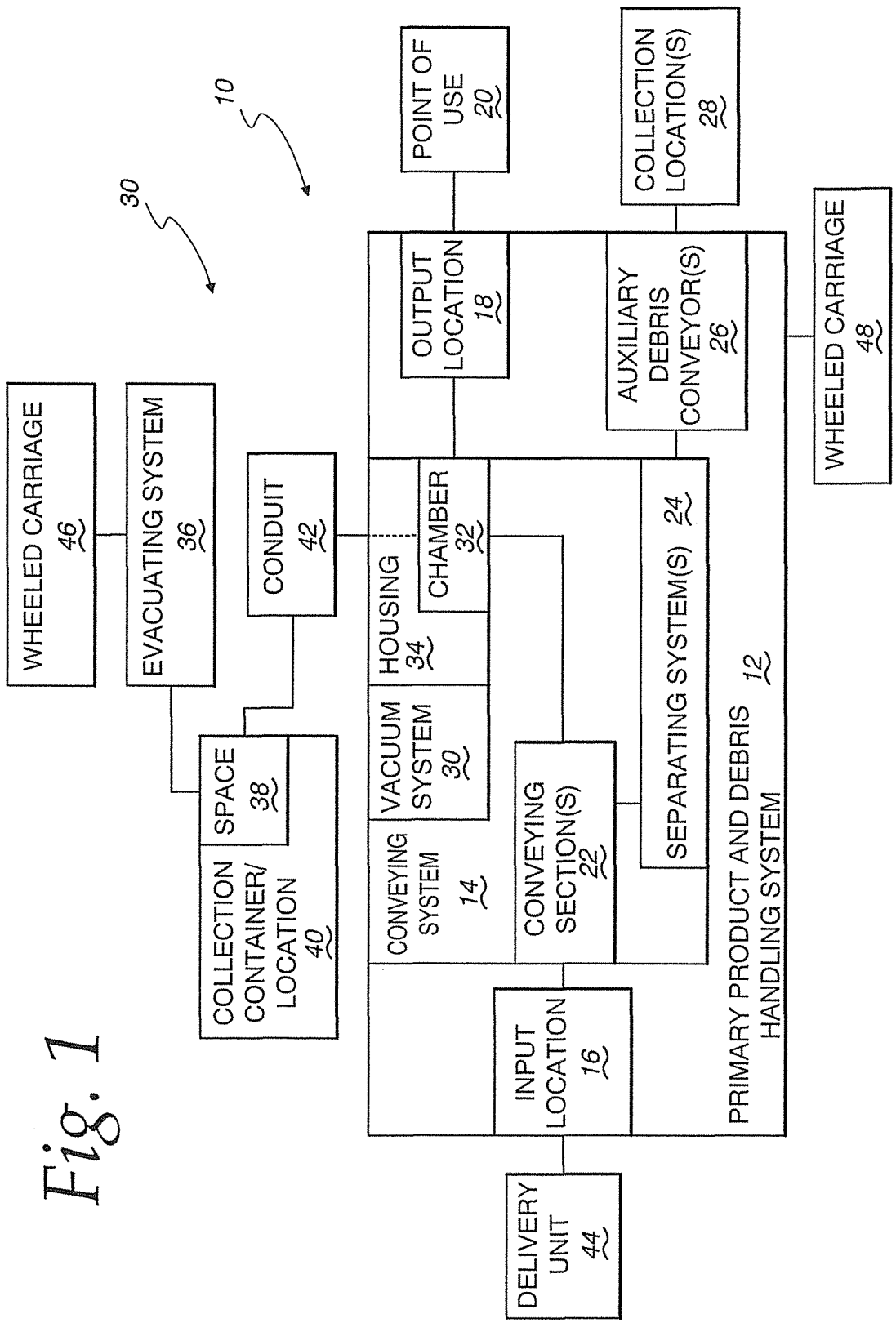
FIG. 1 is a schematic representation of a system/apparatus for separating usable crop from intermixed debris, according to the present invention.

In FIG. 1, a system/apparatus for separating usable crop from intermixed debris, according to the present invention, is shown in schematic form at 10. The apparatus 10 consists of a primary product and debris handling system 12 on which a conveying system 14 is provided. The conveying system 14 is configured to convey usable crop in a processing path from an upstream input location 16 to a downstream output location 18. From the output location 18, the crop can be staged, packaged, or otherwise processed at a point of use 20. The conveying system 14 is made up of a plurality of cooperating conveying sections 22.

The conveying system 14 further includes a plurality of separating systems 24 configured to cause separation of debris intermixed with usable crop as the usable crop is conveyed in the processing path. The separating systems 24 convey separated debris to auxiliary conveyors 26 that deliver the debris to one or more collection locations 28.

The apparatus 10 further includes a vacuum system 30 that is shown to include components that are part of the primary product and debris handling system 12 and components separate therefrom. The entire vacuum system 30 might be incorporated into the primary product and debris handling system 12.

The vacuum system 30 is preferably provided downstream of at least one separating system 24 and is configured to generate a low pressure volume within a chamber 32 bounded by a housing 34. The low pressure volume creates vacuum that draws debris away from the conveying, usable crop, and further assists in advancing the usable crop into the chamber 32 through which the processing path extends to the output location 18.

In the depicted embodiment, the vacuum system 30 consists of an evacuating system 36 that produces low pressure in a space 38 within a container 40 that defines a debris collection location. The space 38 is in communication with the chamber 32 and the housing 34 through a conduit 42. A low pressure volume is created in the chamber 32 through the conduit 42. Separated debris in the housing chamber 32 is caused to move in an accelerated air volume, generated by the evacuating system 36, through the conduit 42 and accumulate in the space 38 in the collection container 40.

As depicted, each of the conduit 42, collection container 40, and evacuating system 36 is separate from the system 12. As noted above, this is not a requirement.

A delivery unit 44 is used to continuously direct a supply of intermixed debris and usable crop to the input location 16. The delivery unit 44 may be integrated into the system 12 or separately constructed.

The depicted evacuating system 36 can be separated from the collection container 40 and is provided with a wheeled carriage 46 to facilitate its transportation to and from, and around, a site at which the apparatus 10 is used.

The primary product and debris handling system 12 is likewise provided with a wheeled carriage 48 to facilitate its transportation to and from, and around, an operating site.

The schematic representation of the apparatus 10 is intended to encompass the components in the exemplary apparatus described herein, as well as virtually an unlimited number of variations of those components and their interactions that would be obvious to one skilled in the art with the teachings of the present invention in hand. The embodiments described below are exemplary in nature only and should not be viewed as limiting.

Figure 2:
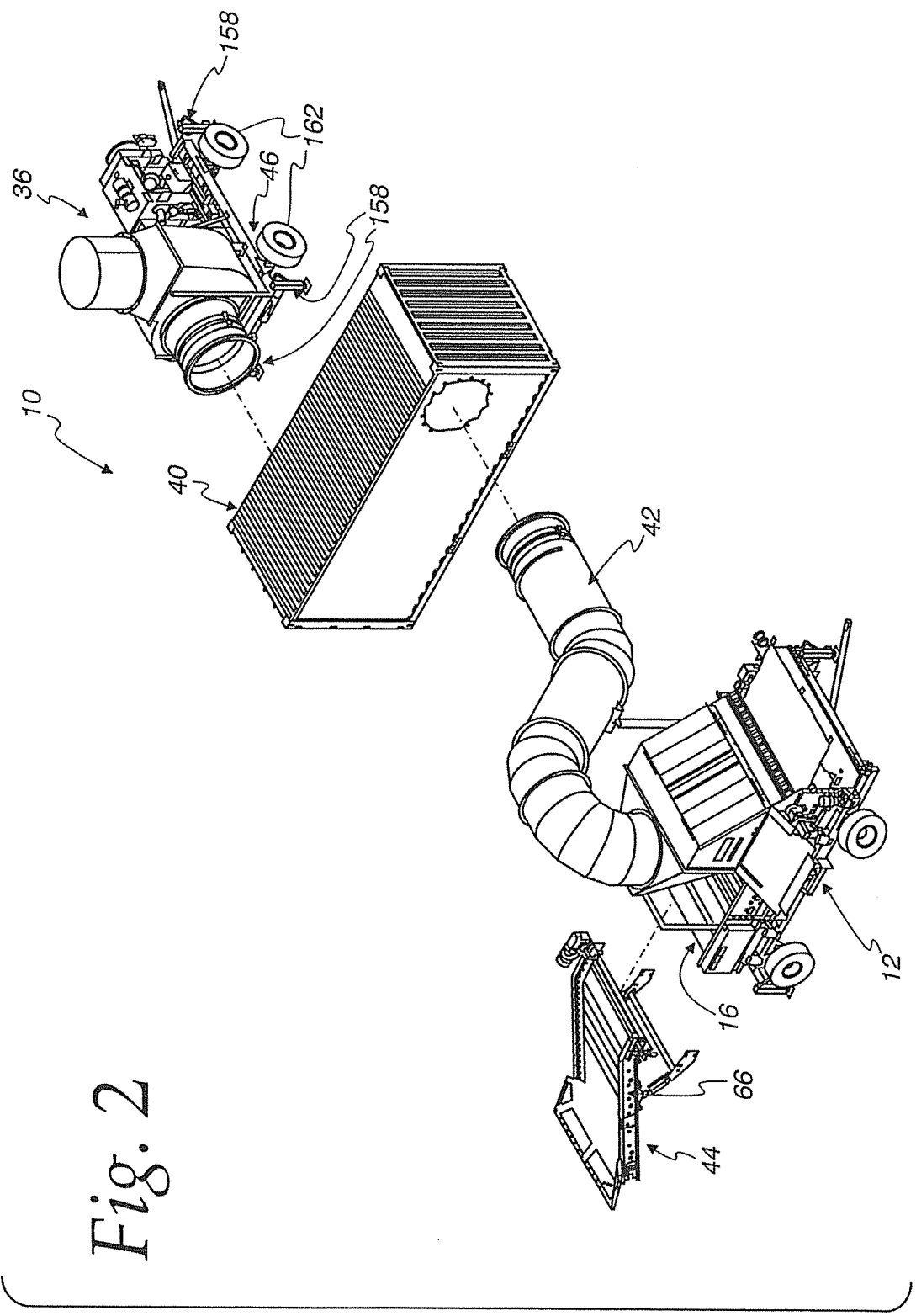
FIG. 2 is an exploded, perspective view of one specific form of system/apparatus, as shown in FIG. 1, and including a primary product and debris handling system, a delivery unit for inputting usable crop mixed with debris, a collection container for debris, and an evacuating system for generating a low pressure volume to control movement of crop and debris.

Before getting into the details of certain of the components making up the exemplary form of the specific system/apparatus 10 shown herein, the basic structure and overall operation of the apparatus/system 10 will be generally described with reference to FIGS. 2-4.

In the depicted exemplary embodiment of the inventive apparatus 10, the primary product and debris handling system 12 is combined with the delivery unit 44. Together these components are supported on the wheeled carriage 48 which has a towing tongue 50 with a hitch component at 52 that can be engaged with a drawing vehicle (not shown). Ideally, the combined dimension of the components on the wheeled carriage 48, and the wheeled carriage 48 itself, is such that travel on public right-of-ways is permitted.

Adjustable feet 54 are provided to selectively and separately elevate and lower the corners of a frame 56 upon which wheels 58 are provided. This allows on site levelling and stabilization of the frame 56 and the components supported thereon.

The delivery unit 44 consists of a conveying component 60 that moves in an endless path around end rollers 62, 64 mounted on a main frame 66. The frame 66 is mounted to the frame 56 so as to pivot relative thereto selectively around a horizontal and laterally extending axis, as indicated by the double-headed arrow 68, to allow an inclination angle α of an upwardly facing surface 70 on the conveying component 60 to be selectively varied, as through an extendible, manually operated cylinder 72. Remote and automated adjustment are also contemplated.

A mixture of usable crop and debris, shown at 74, is introduced in bulk at an upstream end 76 of the delivery unit 44. The mixture 74 travels progressively forwardly and upwardly to a downstream discharge end 78 of the delivery unit 44 at which the mixture 74 falls under its own weight to a lower unit at 80 that functions as both a conveying section 22a and a separating system 24a. The unit 80 is made up of a plurality of intermeshing, parallel, cleaning rollers 82, 84, and an intermediate control cylinder 88 which cooperatively function as a "cleaning table" that removes excess dirt, vines, and other trash. The rollers 82, 84 and cylinder 88 cooperate to create gaps between which small/flat rocks can drop through. By controlling the vertical relationship between the rollers 82, 84 and cylinder 88, a "stall point", at which an accumulated flow is blocked, can be increased/decreased.

Figure 4A:
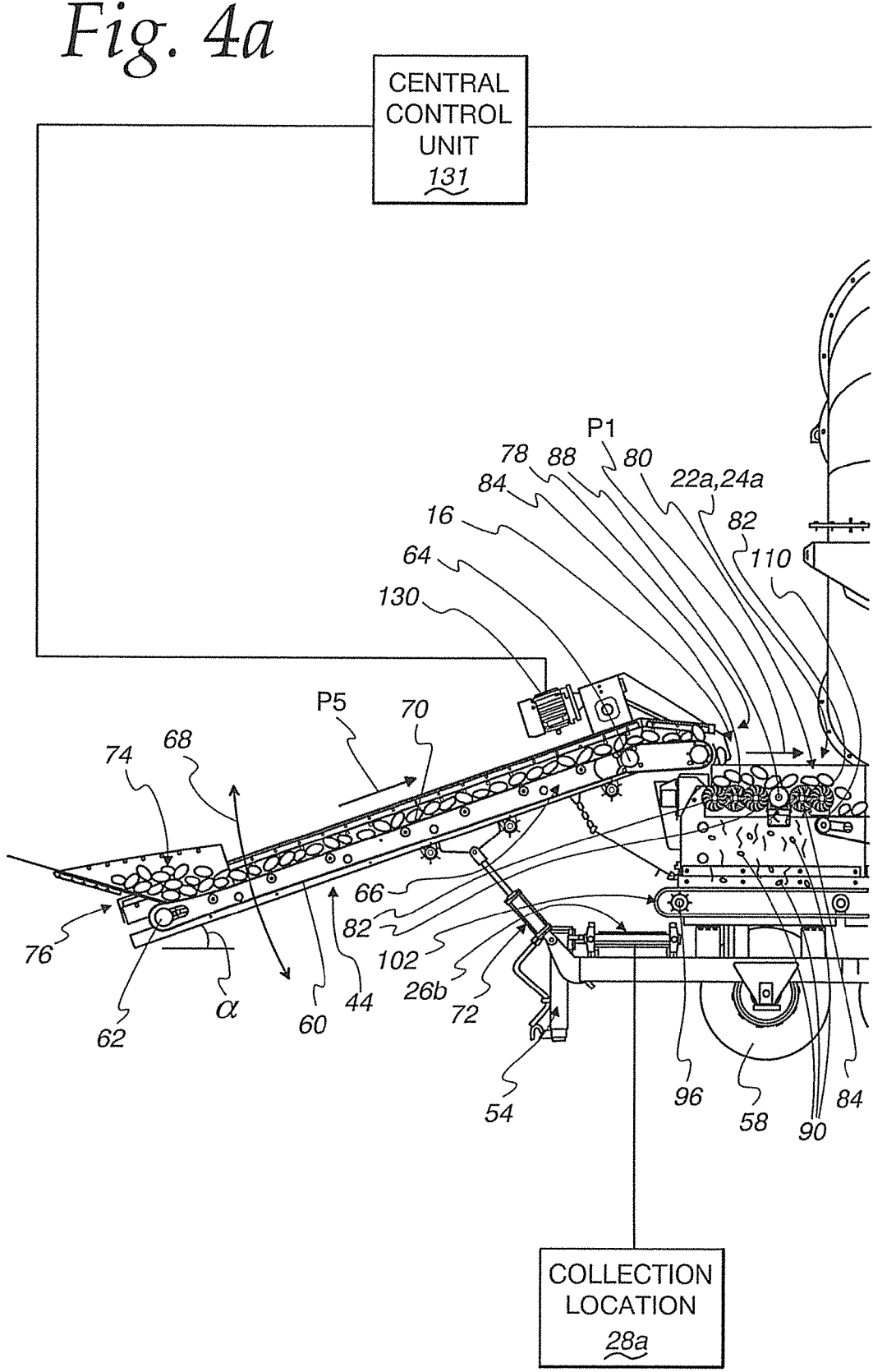
FIG. 4 is a side elevation view of the system/apparatus in FIG. 3.
Figure 4B:
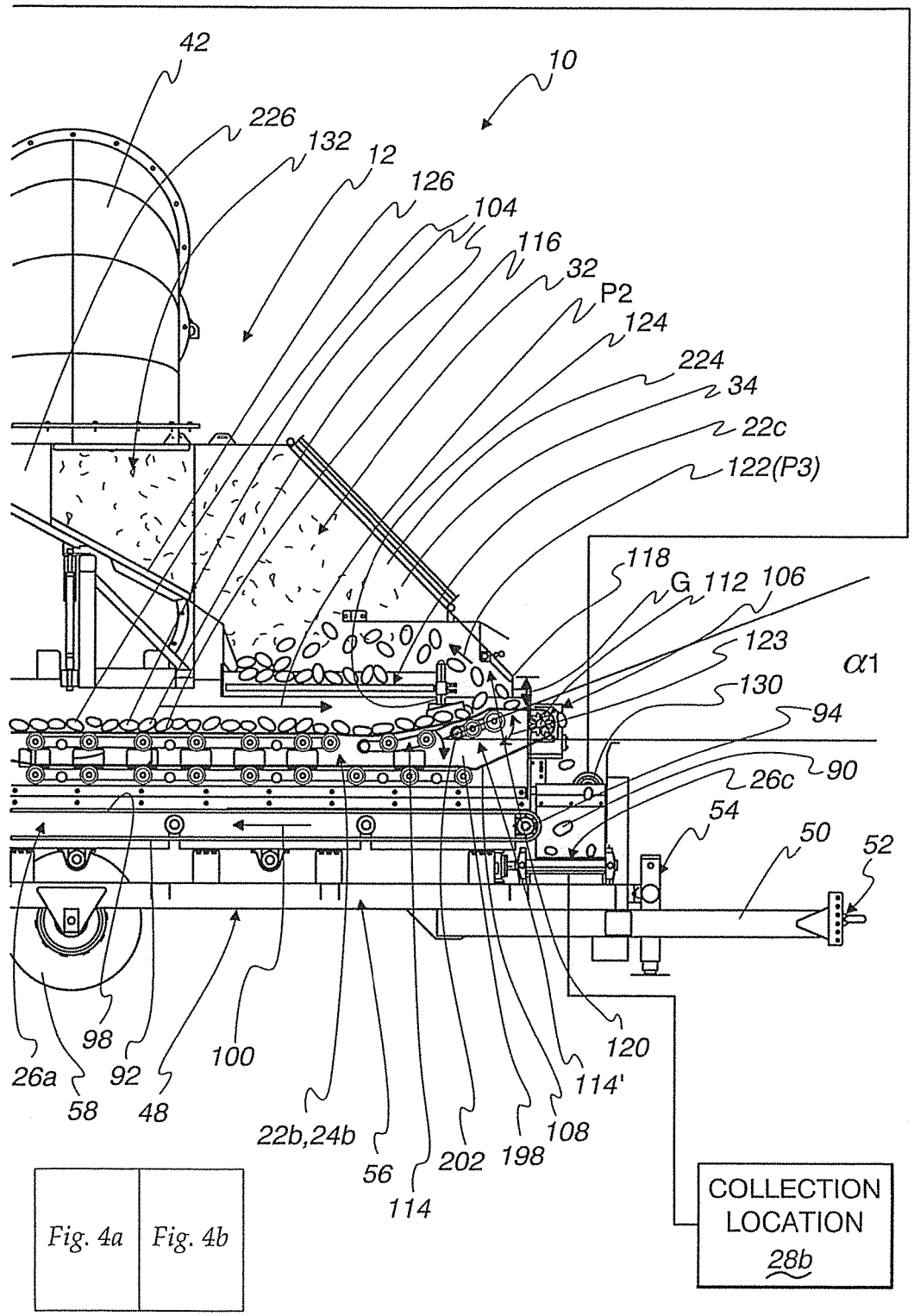

As seen in FIG. 4, rocks 90 that pass between the rollers 82, 84 and cylinder 88 are intercepted by a debris conveyor 26a that consists of an endless conveying component 92 trained around end rollers 94, 96. An upwardly facing surface 98 on the conveying component 92 advances the rocks 90, and potentially other debris passing through the rollers 82, 84 and cylinder 88, rearwardly in the direction of the arrow 100. This debris is advanced over an end 102 of the auxiliary conveyor 26a and falls therefrom under its own weight to an additional auxiliary conveyor 26b, which advances the accumulated debris laterally to a desired collection location 28a.

The usable crop 104 (shown as but not limited to potatoes), with at least some of the debris from the mixture 74 removed, continues to beyond the unit 80 to a further conveying section 22b, which also functions as a separating system 24b. The conveying section 22b is reconfigurable adjacent its downstream end 106.

More specifically, the conveying section 22b consists of an endless conveying component 108 trained about a series of rollers including end rollers 110, 112, with the latter elevated above the former. The rollers 110, 112 turn around substantially parallel, horizontal axes. In addition to the end rollers 110, 112, there is a plurality of intermediate support rollers/roller assemblies, including separate support roller assemblies at 114, 114' that function independently and are configured to locally change the inclination angle and height of an upwardly facing surface 116 on the conveying component 108 in the vicinity of where the conveying crop 104 is diverted progressively upwardly towards the end 106.

The support roller assembly 114' is configured so that a variable gap G is formed between the surface 116 overlying the support roller assembly 114' and a lower edge 118 of the housing 34 bounding an inlet 120 to the chamber 32 bounded by the housing 34. The air velocity at the inlet 120 to the chamber 32 is adequate to draw the crop 104 off of the conveying surface in the direction of the arrow 122 into the chamber 32 towards and onto a further conveying section 22c. Rocks 90 can pass between the edge 118 and upwardly facing surface 116 to be directed past the end 106, whereupon they fall under their weight to an auxiliary conveyor 26c. Through the auxiliary conveyor 26c, this debris can be controllably directed to a separate collection location 28b.

The support roller assembly 114' is pivotable about a horizontally and laterally extending axis, as indicated by the double-headed arrow 123, to change an inclination angle $\alpha 1$ of the upwardly facing surface 116 under the inlet 120, thereby varying the angle at which the crop advances towards the inlet 120 and to a certain extent the suction applied to the crop at the inlet 120.

The upstream support roller assembly 114 is configured so that in response to the application of a predetermined downward force, as by a large anticipated rock size, the downstream end of the support roller assembly 114 will pivot downwardly around a horizontally and laterally extending axis to locally increase the vertical spacing between the upwardly facing surface 116 and a horizontally extending frame component 124 so that such a large rock can pass thereby in the processing path to move eventually off of the conveying section 22b to the auxiliary conveyor 26c. Once the weight of the rock(s) is removed, the support roller assembly will be biased to its resting state as shown in FIG. 4.

Once the crop 104 is drawn into the housing chamber 32, it is distributed across the width of the conveying section 22c. Additional loose debris is drawn upwardly by the airstream that creates the low pressure volume in the chamber 32 and guided by an inclined housing surface 126 through a top opening 127 in the housing 34 and into the conduit 42. The cleaned usable crop 104 conveys in the direction of the arrow 128 to the output location at 18 from where the crop 104 is delivered to the point of use 20, which as previously indicated, may be a staging location, one or more containers, etc.

Through the various conveying sections 22a, 22b, 22c, and the vacuum system 30, the usable crop 104 is caused to travel in a series of discrete path portions that together make up the overall processing path between the input location 16 and output location 18. The conveying section 22a defined by the unit 80 conveys the crop 104 in a path portion P1 that is substantially horizontal in a forward direction. The conveying section 22b conveys the crop 104 in a path portion P2 that is substantially parallel to the path portion P1. From the conveying section 22b, the vacuum system 30 causes the crop 104 to travel rearwardly in the direction of the arrow 122 that identifies a path portion P3. Once on the conveying section 22c, the usable crop 104 travels laterally in the direction of the arrow 128, which identifies the path portion P4.

The delivery unit 44 may also be considered to define part of the processing path, specifically causing the usable crop 104 to travel in a path portion P5 between the upstream end 76 and the input location 16 in a substantially straight line parallel to the path portions P1, P2.

The auxiliary debris conveyor 26a can be extended, as depicted, to underlie substantially the entire length of the conveying sections 22a, 22b/separating systems 24a, 24b, thereby to intercept separated debris passing off/through these conveying sections 22a, 22b/separating systems 24a, 24b.

The conveying components 60, 92, 108 are driven by motors 130 that allow for infinite speed control to maximize the processing capability based upon the nature of the crop and the encountered debris. The operation of all the motors 130 can be coordinated through a central control unit 131.

As mentioned above, the last stage of debris separation produces debris pieces 132 that become entrained in the air flow in the housing chamber 32. This debris 132 is drawn into the conduit 42 through the top housing opening 127 and, through the conduit 42, the debris 132 is delivered to the space 38 defined by the collection container 40.

In this embodiment, the collection container 40 has a generally square construction, though this is not a requirement. The depicted collection container 40 has a generally rectangular shape, as viewed in plan, with a pair of spaced side walls 134, 136 and shorter, spaced, end walls 138, 140. The end wall 140 is configured to gain access to the space 38. The end wall 140 may incorporate one or more movable doors D.

The side wall 136 has a first opening 144 formed therethrough to accommodate an end 146 of the conduit 42. A second opening 148 is formed through the side wall 134 to allow communication between the evacuating system 36 and the space 38.

Each of the openings 144, 148 is spaced a height H above a floor 150 of the collection container 40 upon which debris is progressively accumulated. The height H is selected so that a substantial quantity of debris can be accumulated upon the floor 150 without obstructing either of the openings 144, 148. The drop in air velocity generated by the evacuating system 36, below the openings 144, 148, allows the debris to settle into the space 38 below the openings 144, 148 while at the same time clean air is allowed to exhaust from the collection container space 38 through the opening 148 and discharge from an outlet conduit 152 to the atmosphere. As a result, substantially clean air is discharged to the surrounding environment while the majority of the debris is confined to within the space 38.

In a preferred form, the conduit 42 has an inverted "U" shape. The debris 132 is caused to be funnelled by the inclined housing surface 126, and an overall converging housing shape, into one leg 154 of the U. From the leg 154, the debris 132 travels in a downward path through the other leg 156 of the "U" and discharges into the space 38 through the first opening 144.

As noted above, the evacuating system 36 may be a self-contained unit separable from the collection container 40 and supported on the wheeled carriage 46.

Levelling feet 158 are provided on a frame 160 that is supported by the wheeled carriage 46. The levelling feet 158 can be used on a particular site to elevate the frame 160 off of carriage wheels 162, to stably support the evacuating system 36 in a desired orientation relative to the collection container 40.

The frame 160 has a towing tongue 164 with a hitch component 166 to engage a cooperating component on a drawing vehicle (not shown) used to transport the evacuating system 36.

Additional detail of certain components of the apparatus 10 will now be described. It should be understood that this detail is not critical to the present invention, but helpful in fully understanding the preferred form thereof.

Figure 5:
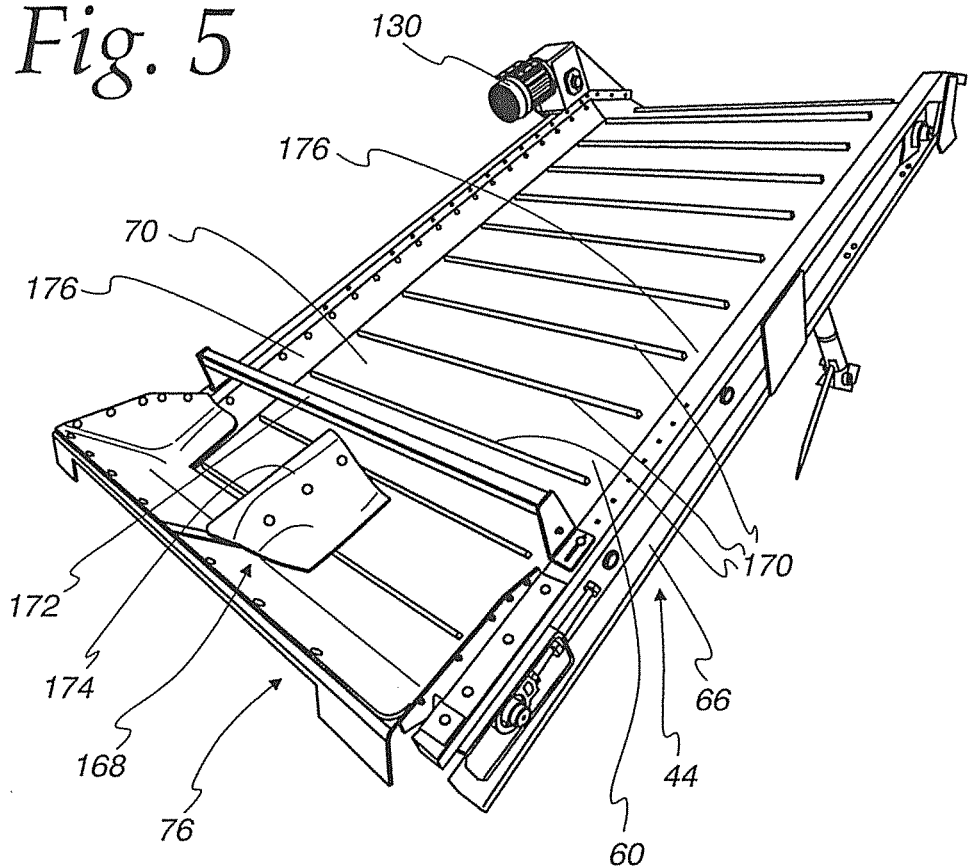
FIG. 5 is an enlarged, rear, perspective view of the delivery unit shown in the system/apparatus in FIGS. 2-4.

In FIG. 5, details of the delivery unit 44 are shown. At the upstream end 76, a funnelling wall 168 is provided to control and confine the introduced mixture 74. The introduced mixture 74 is guided thereby towards the conveying component 60. The conveying component 60 has laterally extending slats 170 projecting upwardly therefrom at regular intervals along the length of the conveying component 60. The slats 170 positively grip the mixture 74 as the conveying component 60 is advanced.

The frame 66 further comprises an inverted "U"-shaped height control bar 172 that defines, in conjunction with the upwardly facing conveying surface 70, a surrounded entry passage with a fixed area. This facilitates control of the volume of the mixture 74 being introduced to against the conveying surface 70.

A laterally centered, and inverted, "V"-shaped divider 174 disperses introduced mixture 74 evenly across the width of the conveying surface 70.

The mixture 74 is confined at the lateral ends of the surface 70 by flexible skirts 176.

Figure 6:
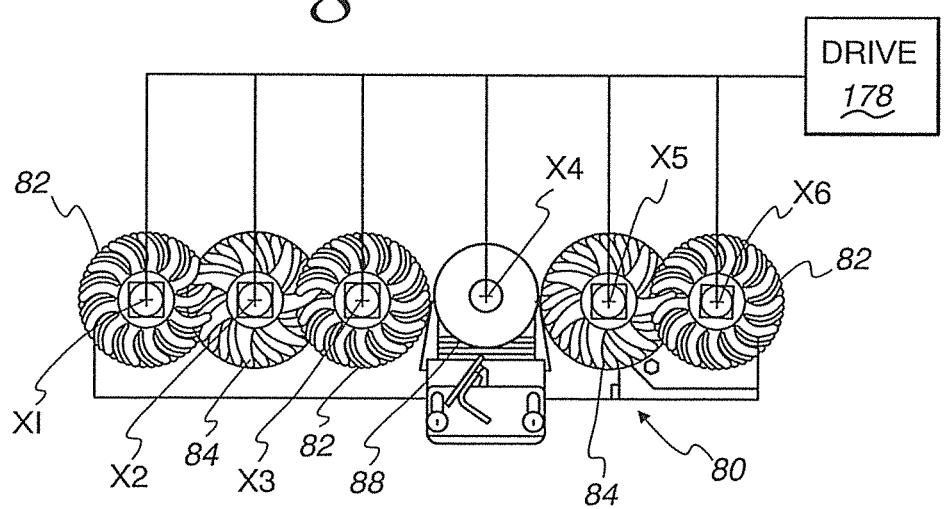
FIG. 6 is an enlarged, side elevation view of a unit on the primary product and debris handling system in FIGS. 2-4 that makes up a conveying section/separating system for debris.
Figure 7:
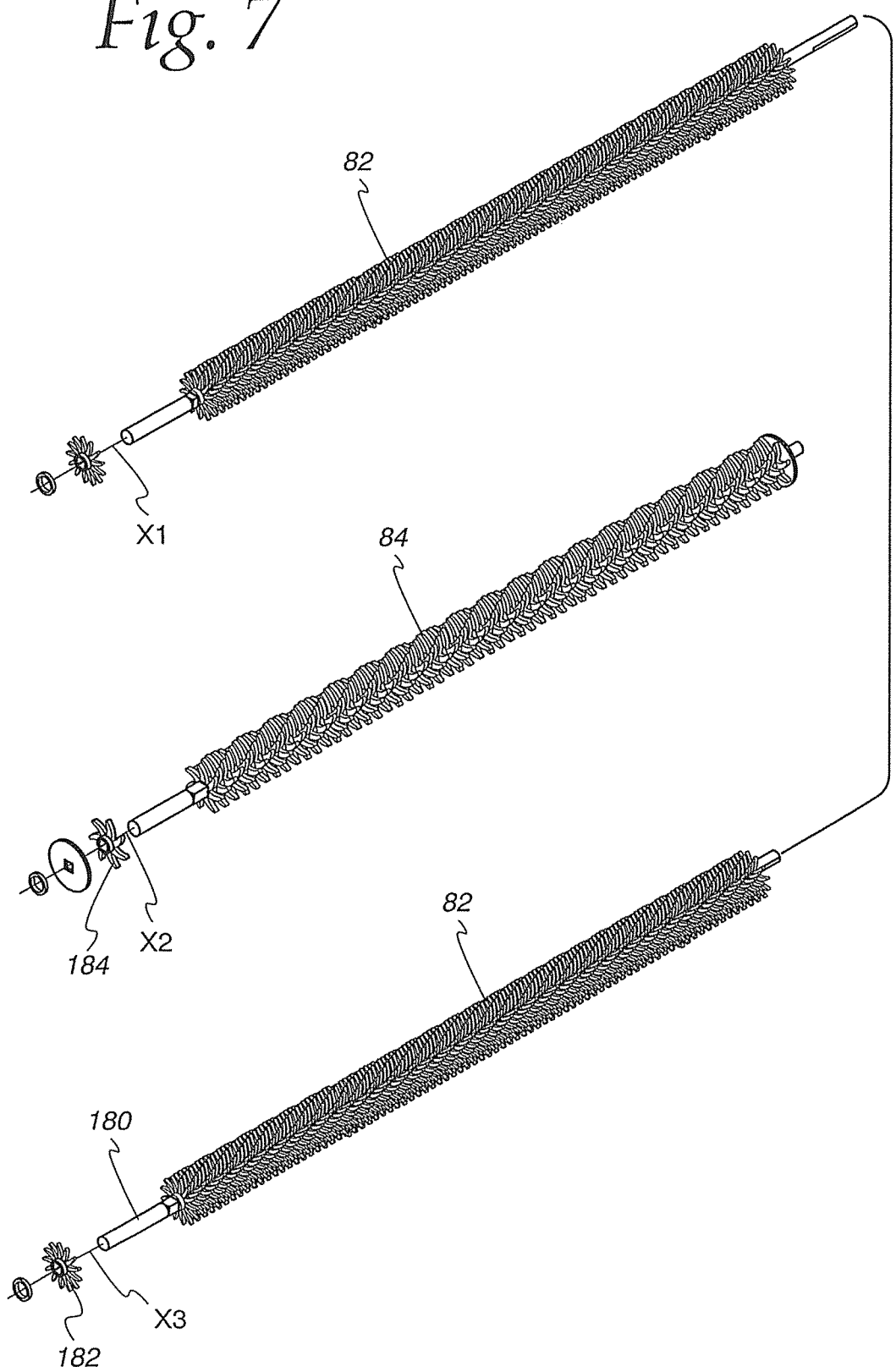
FIG. 7 is an enlarged, exploded, perspective view of cooperating rollers on the unit in FIG. 6.
Figure 8:
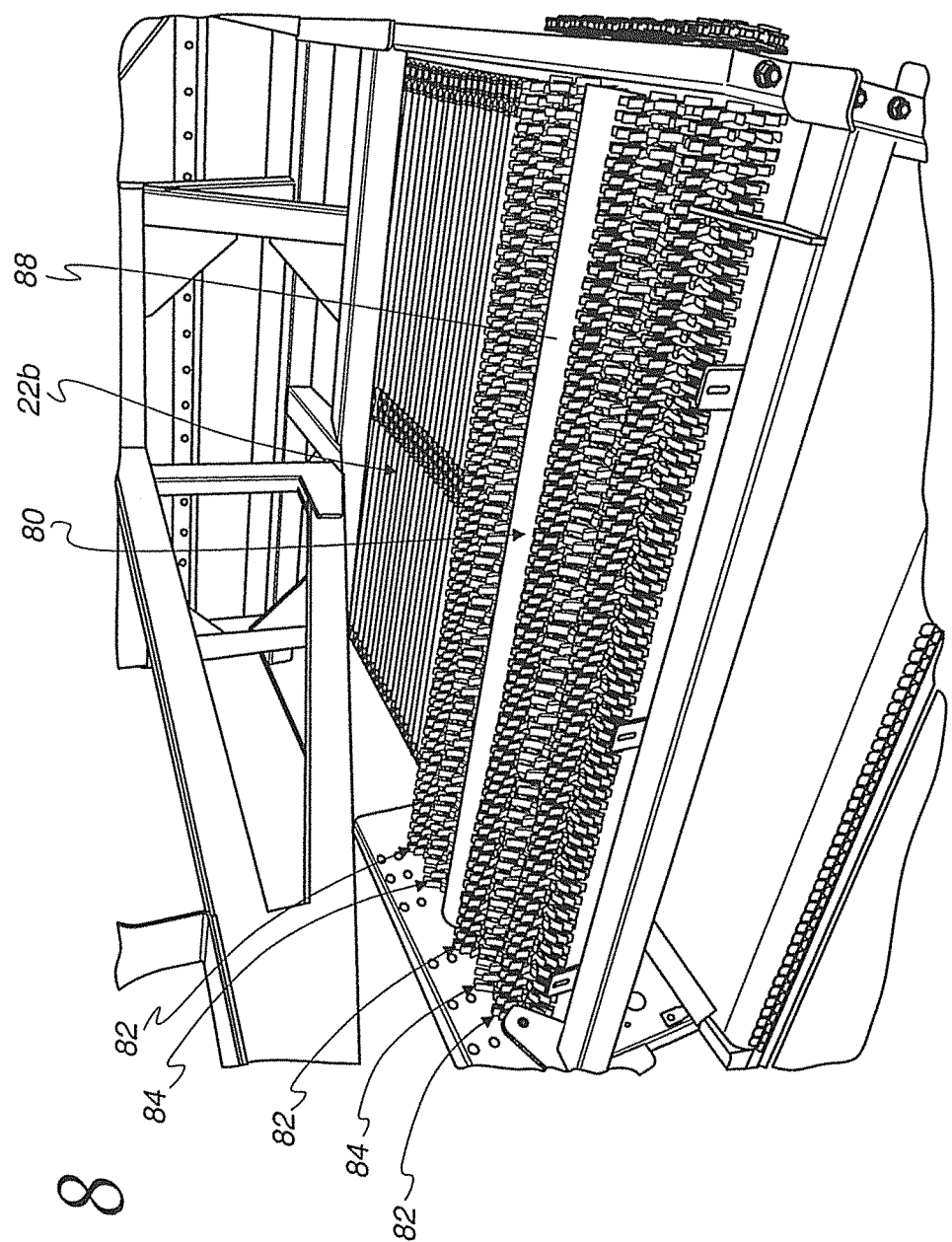
FIG. 8 is an enlarged, fragmentary, rear perspective view of the unit in FIGS. 6 and 7 on the primary product and debris handling system.

In FIGS. 6-8, additional detail regarding the unit 80 is shown. The unit 80 in this embodiment consists of three of the aforementioned rollers 82, two of the rollers 84, and the cylinder 88 between the rollers 82, 84 in the depicted combination. The rollers 82, 84 and cylinder 88 are rotatable about parallel axes X1, X2, X3, X4, X5 spaced so that the rollers 82, 84 are in mesh. The rollers 82, 84, 88 and cylinder 88 are simultaneously rotated by a drive 178.

The rollers 82 each is made up of a shaft 180 with fingered wheels 182 keyed to rotate therewith and be slidable axially therealong. The roller 84 has the same general construction with a different configuration for the fingered wheels 184 that can be arranged to cooperatively produce the depicted spiral shape. The rotating and meshed rollers 82, 84 cooperate to break loose excess dirt, vines, and other trash accompanying the usable crop 104. The meshed arrangement creates gaps/openings for small rocks/debris to pass downwardly therethrough.

The cylinder 88 can be moved vertically relative to the rollers 82, 84 to create a gap at the cylindrical roller 88 that allows small/flat rocks to drop therethrough. By adjusting the cylindrical roller 88 up or down, a "stall point" can also be adjusted for the incoming supply of crop 104 with intermingled debris. By changing the stall point, the residence time of the mixture 74 on the unit 80 can be selected to control the degree of cleaning and debris breakup performed by the unit 80.

In FIG. 8 the transition from the unit 80 to the conveying section 22b can be clearly seen.

Figure 9:
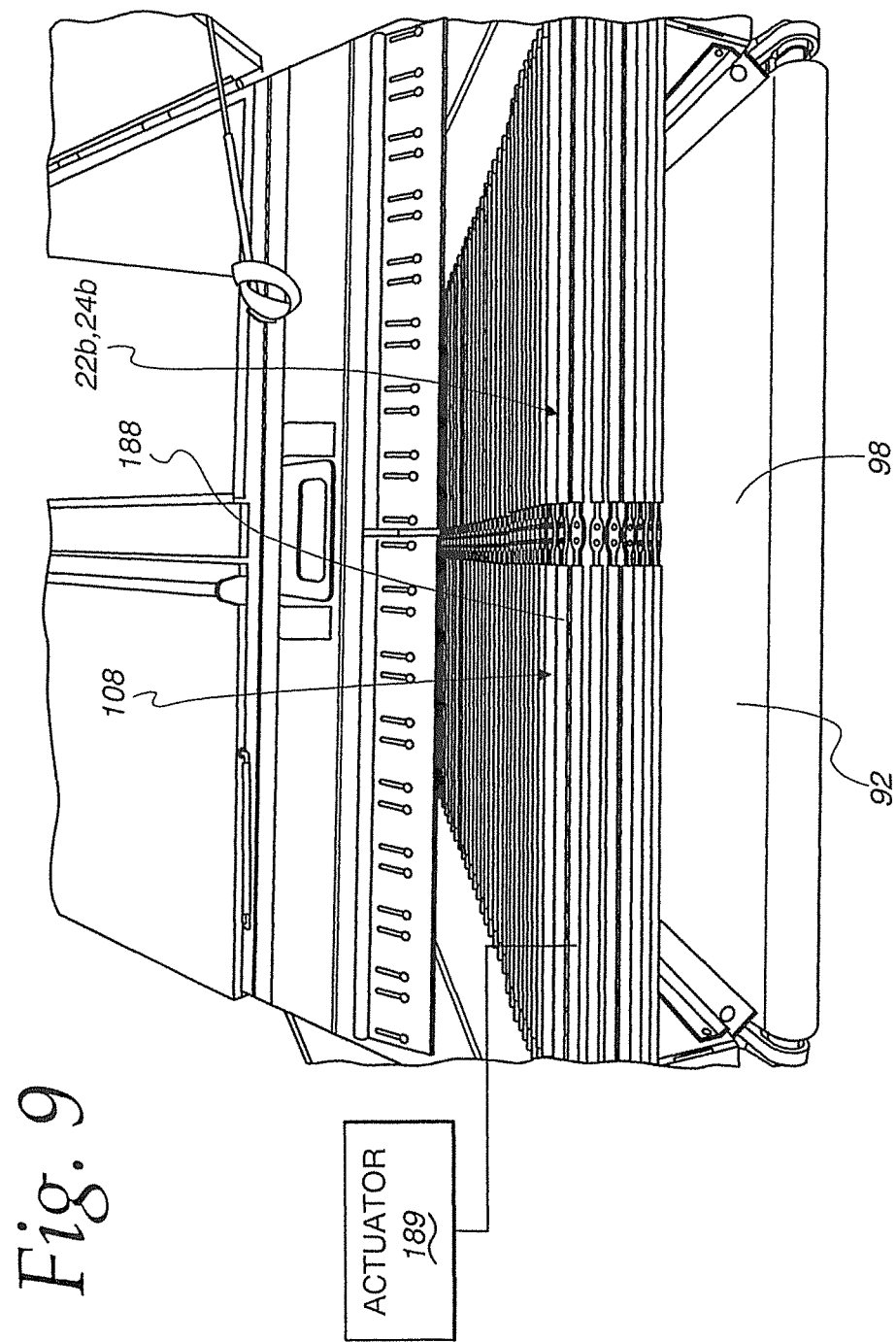
FIG. 9 is a view as in FIG. 8 and showing an additional conveying section/separating system on the primary product and debris handling system downstream of the unit shown in FIG. 8.

FIG. 9 shows the upstream end of the conveying section 22b/separating system 24b. The conveying component 108 is made from a series of elongate, laterally extending tubes 188 that are in parallel relationship with gaps therebetween that allow passage of small debris downwardly therethrough to the solid surface 98 of the conveying component 92 that is traveling in an opposite direction. The tubes 188 may be coated with rubber and may be shaken by an appropriate actuator 189 to enhance debris separation and release to the underlying auxiliary conveyor 26b.

Figure 10:
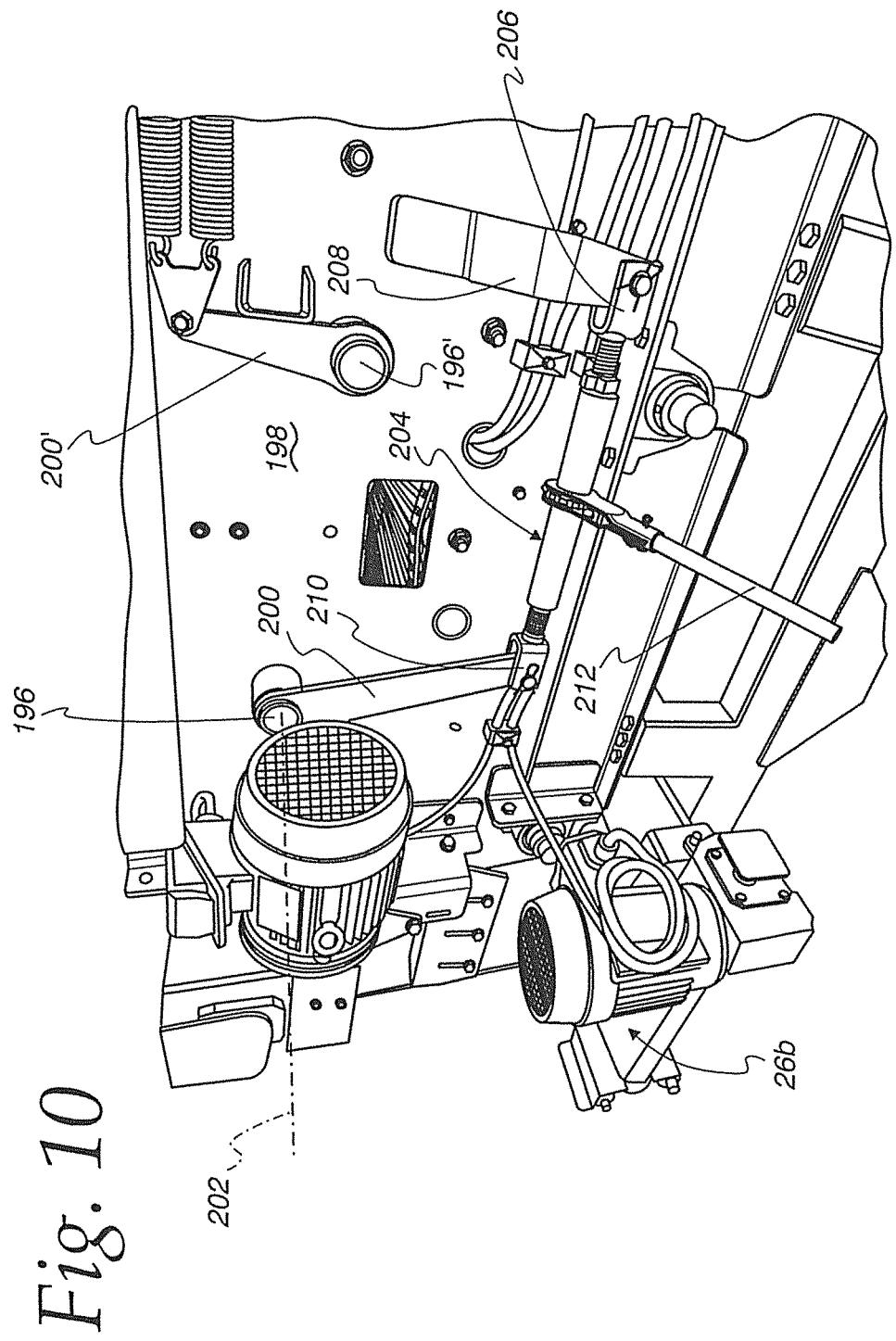
FIG. 10 is an enlarged, fragmentary, perspective view of structure for controlling separate support roller assemblies on the conveying section/separating system shown in FIG. 9.
Figure 11:
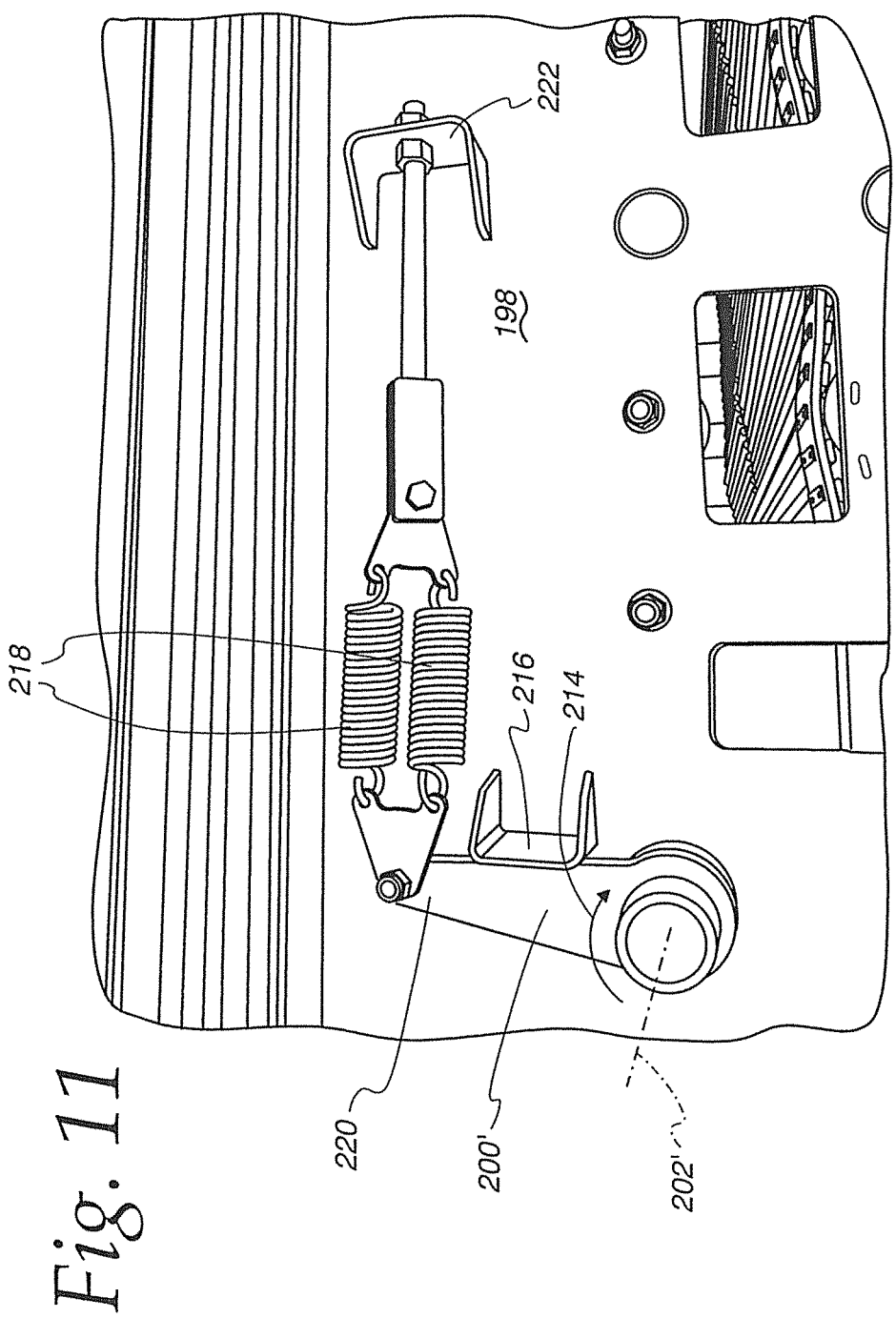
FIG. 11 is a view similar to that in FIG. 10 and showing the controlling structure associated with one of the support roller assemblies.
Figure 12:
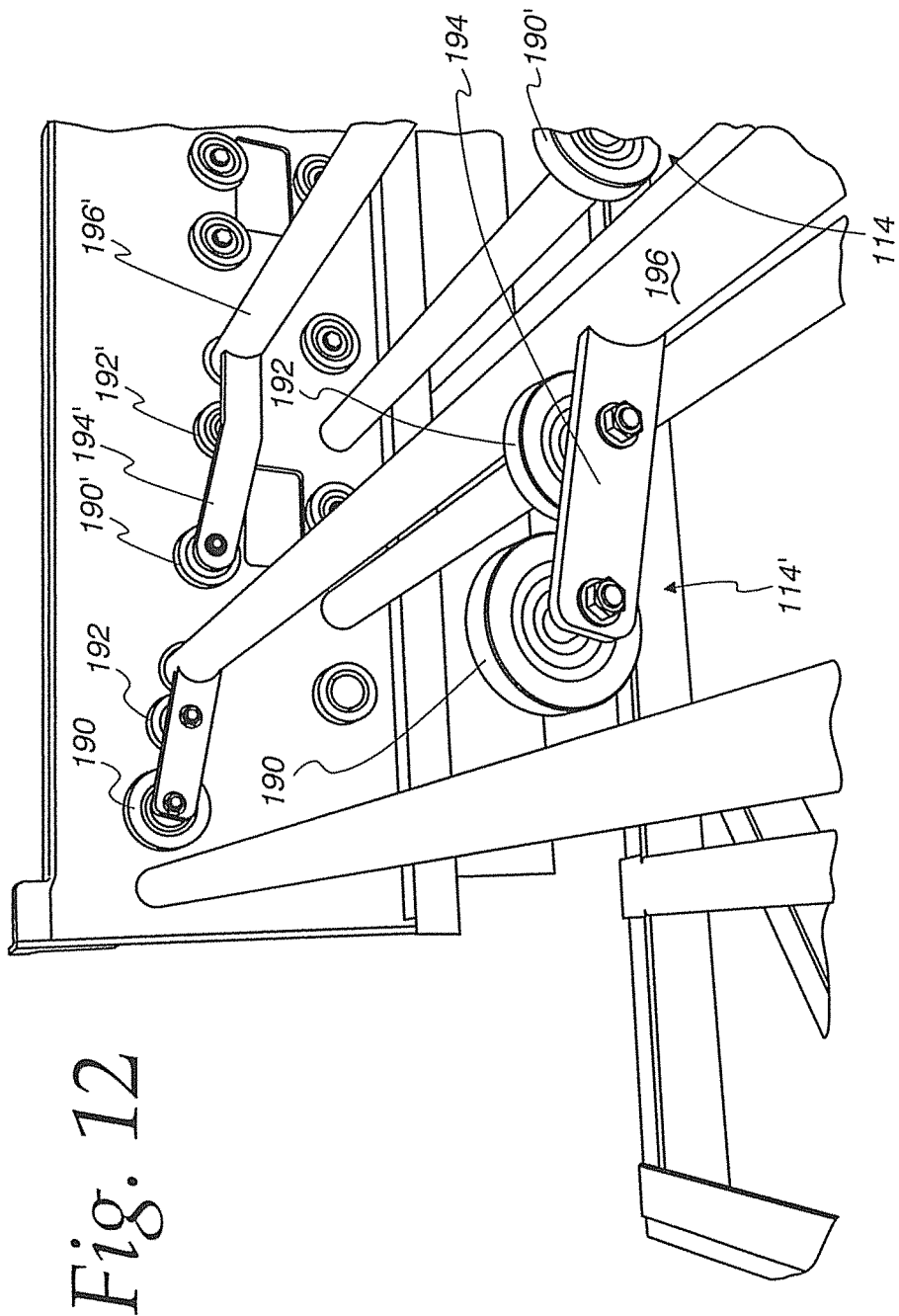
FIG. 12 is an enlarged, fragmentary, perspective view of the frame portion in FIGS. 10 and 11 and showing the support roller assemblies thereon.

In FIGS. 10-12, details for the support roller assemblies 114, 114', as seen also in FIG. 4, are shown. It should be mentioned that the various conveying sections 22 may utilize roller components, support roller assemblies, etc. of like construction at laterally spaced locations. The description herein is limited to the roller components/support roller assemblies at one such location.

The support roller assembly 114' has separate rollers 190, 192 supported on a cantilevered arm 194. The arm 194 extends from a tube 196 that projects through a frame part 198. An actuating arm 200 is connected to the projecting part of the tube 196. The tube 196, together with the arms 194, 200, pivots as a unit relative to the frame part 198 about a laterally extending axis 202.

The angular position of the actuating arm 200, and thus the arm 194 and associated rollers 190, 192, is controlled by a manually operated actuator at 204. The actuator 204 has an elongate configuration with one end 206 attached for pivoting relative to the frame part 198 through a bracket 208. The opposite end 210 is pivotably connected to the end of the arm 200, remote from the tube 196.

The actuator 204 utilizes cooperating threaded components that are relatively turned to change the effective length thereof. As depicted, this relative turning is accomplished through a hand-operable tool 212 which may utilize a ratchet arrangement. Alternatively, automated adjustment can be effected. By operating the actuator 204, the angle $\alpha 1$ of the incline of the conveying component 108 can be locally changed, thereby changing the angle at which the crop is advanced towards and through the chamber inlet 120. The spacing between the inlet 120 and the location on the conveying component 108 at which crop separates can also be controlled through this adjustment.

Upstream of the support roller assembly 14 is the aforementioned support roller assembly 114, which repositions under the weight of large rocks and the like. The roller assembly 114 has rollers 190', 192' carried on an arm 194' at each side of the conveying section 22b. The arms 194' have an associated tube 196' that projects through the frame part 198 and connects to an actuating arm 200'.

The arm 200' is normally biased around a pivot axis 202' in the direction of the arrow 214. As this occurs, the actuating arm 200' abuts to a stop element 216 fixed on the frame part 198 to consistently place the arm 200' and support roller assembly 114 in a relaxed/no load position, as shown in FIG. 4. A pair of tension coil springs 218 act between an end 220 of the arm 200' and a bracket 222 on the frame part 198 to draw the roller assembly 114 to its no load position.

Figure 13:
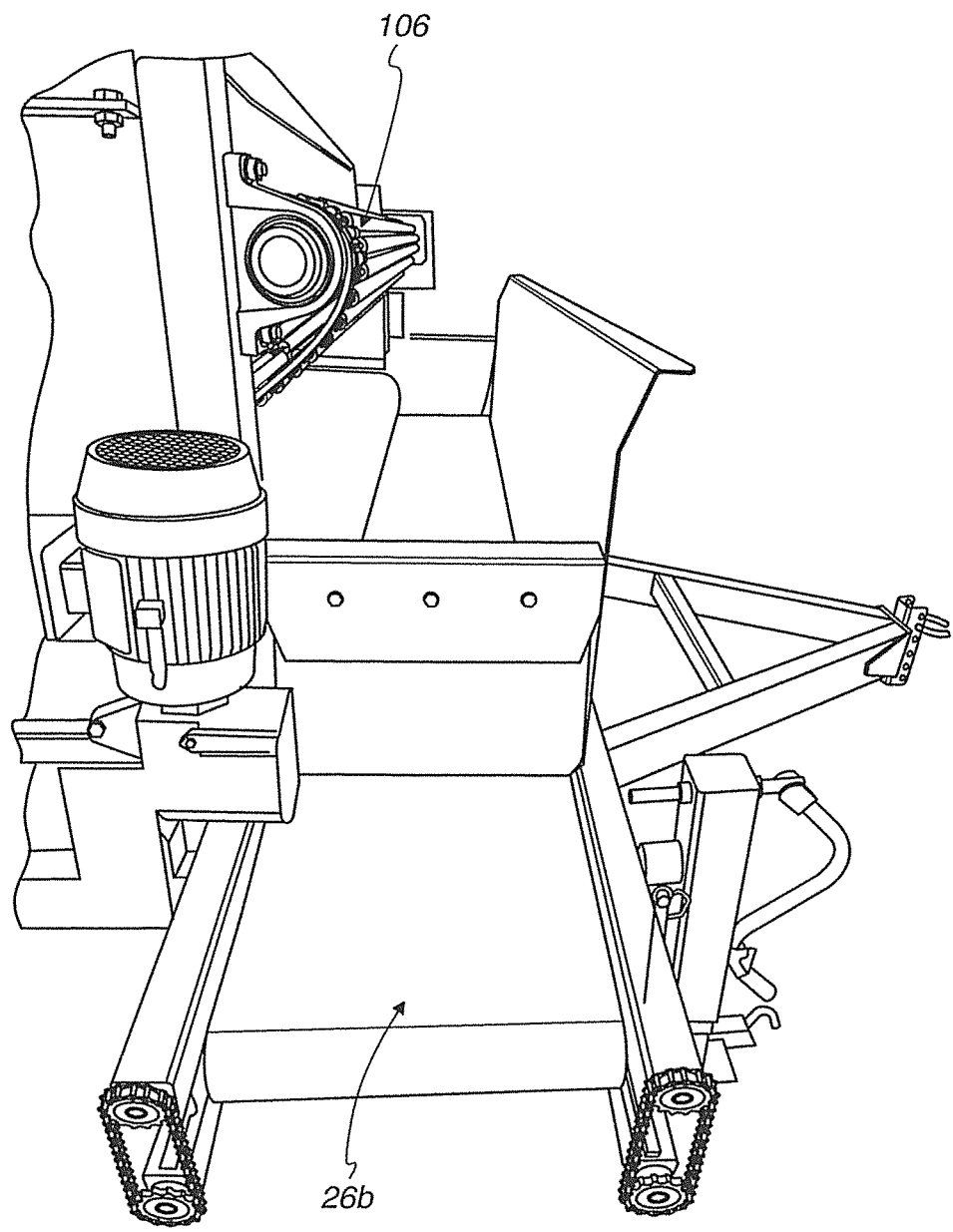
FIG. 13 is an enlarged, fragmentary, perspective view of an auxiliary conveyor for debris separated from the conveying section/separating system shown in FIG. 9.
Figure 14:
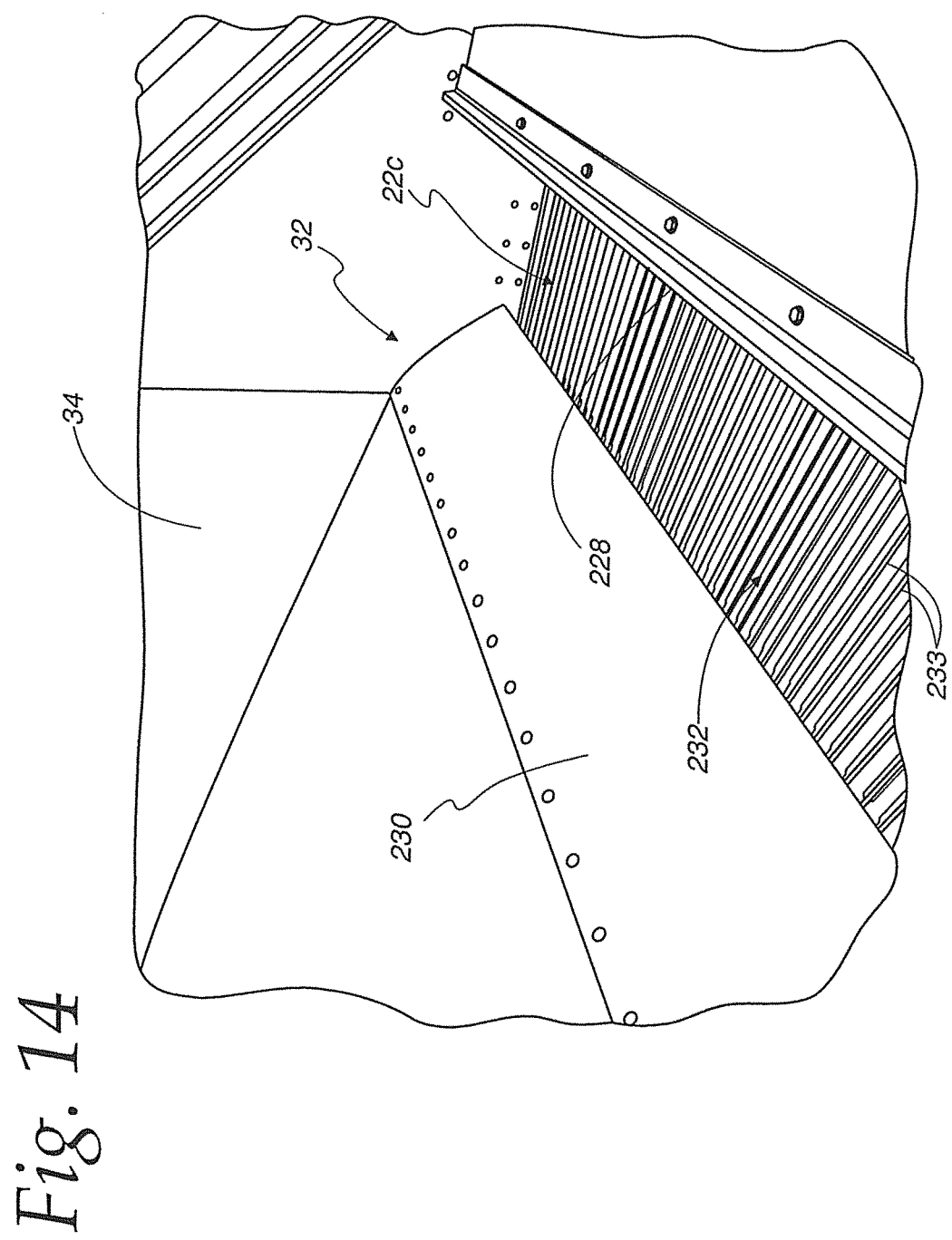
FIG. 14 is an enlarged, fragmentary, perspective view of the inside of a housing on the primary product and debris handling system within which the low pressure volume is generated to reposition crop and debris moving along the conveying section/separating system in FIG. 9.
Figure 15:
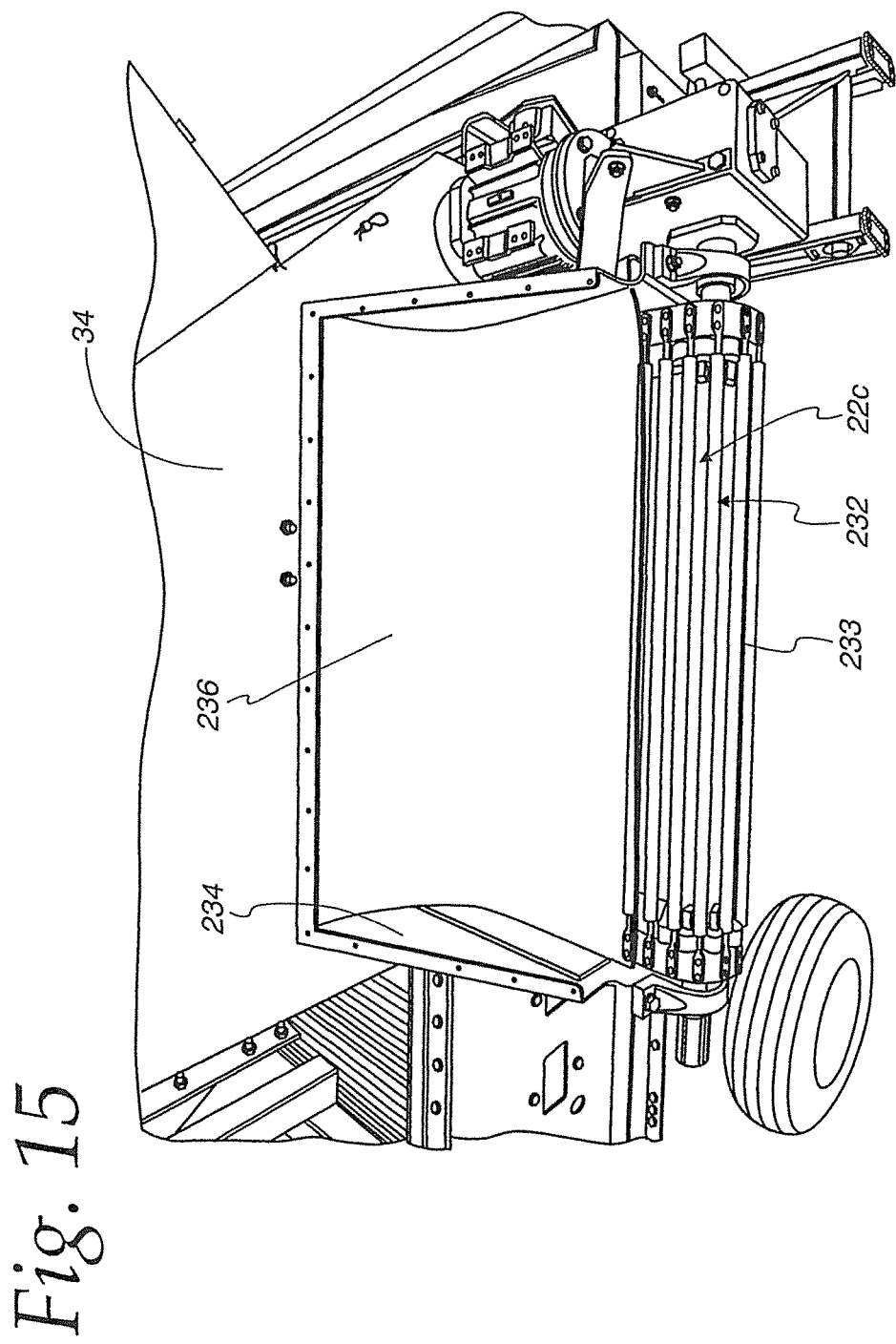
FIG. 15 is an enlarged, fragmentary, perspective view of an extension on the housing in FIG. 14 showing a shield associated with the underlying conveying section moving within the inside of the housing in FIG. 14.
Figure 16:
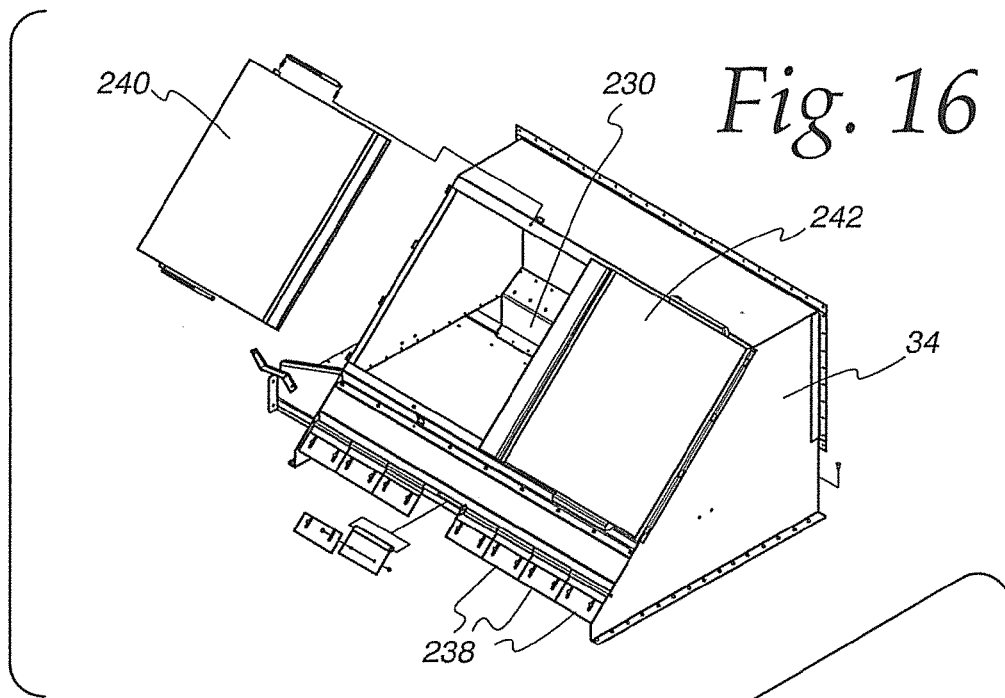
FIG. 16 is an enlarged, exploded, perspective view of the housing as shown in FIGS. 14 and 15.
Figure 17:
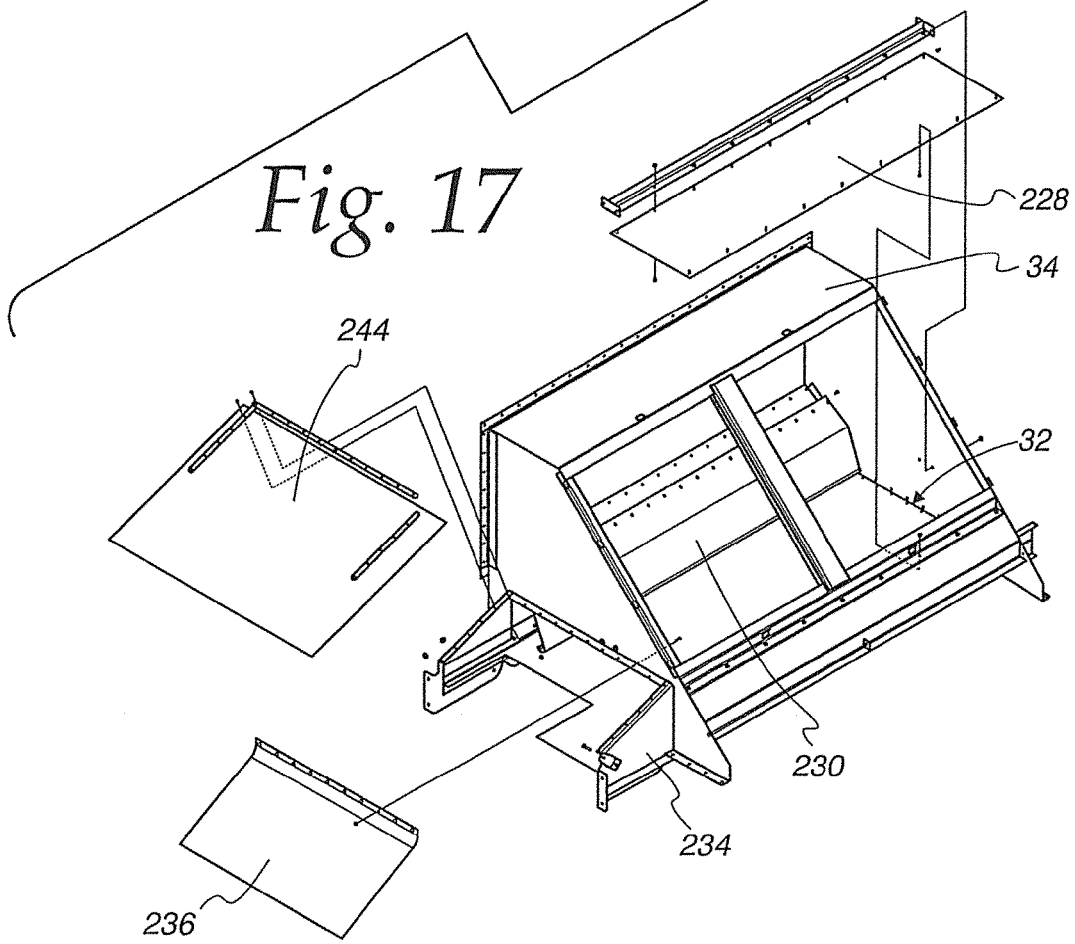
FIG. 17 is an enlarged, exploded, perspective view of the housing as shown in FIG. 16 and taken from a different perspective.
Figure 18:
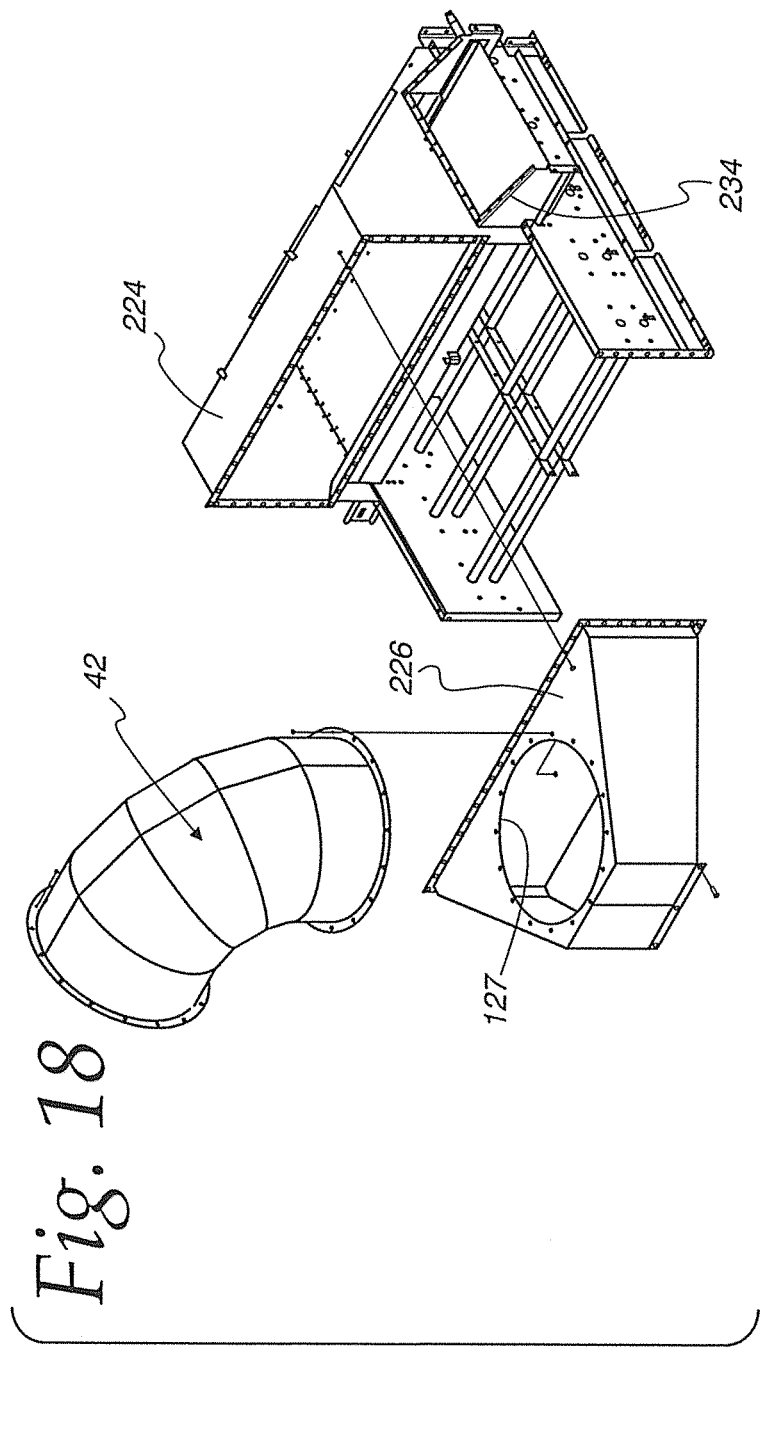
FIG. 18 is an enlarged, exploded, perspective view of the housing in FIGS. 14-17 and in relationship to a conduit section that communicates with the collection container.

When a predetermined weight is applied to the conveying component, the springs 218 will extend to locally lower the conveying component in the vicinity of the frame part 124, thereby to allow a greater clearance so that the heavy debris/rock may pass beyond the frame part 124 to move off of the end 106 of the conveying section 22b to the auxiliary conveyor 26b, as shown in FIGS. 10 and 13.

In FIGS. 14-18, additional details of the housing 34 and chamber 32 defined thereby are shown, as well as the interaction of the housing 34 with the conveying section 22c. These components are shown assembled on the apparatus in FIGS. 2-4.

The housing 34 has two main parts—a crop control component 224 and a transition component 226 that connects between the crop control component 224 and the conduit 42.

The crop control component 224 is generally wedge-shaped so that the portion of the chamber 32 bounded thereby diverges towards the transition component 226, which in turn converges towards the top opening 127.

Flexible flaps 228, 230 are provided on the housing 34 at the sides of the conveying section 22c. The flap 228 confines crop at one side of the conveying section 22c. Crop that is propelled to encounter the flexible flap 230 on the other side of the conveying section 22c is guided under its own weight downwardly by a convex surface thereon to the conveying surface 232 on the conveying section, which is shown with discrete slats 233 that enhance gripping and conveyance of crop. The flexible construction of the flaps 228, 230 allows them to absorb impact forces from the crop without inflicting damage thereon.

A lateral extension housing 234 supports an additional flexible flap 236 which overlies and affords a partial seal where the conveying section 22c departs from the chamber 32, thereby to maximize low pressure maintenance on the chamber 32 and air flow velocity therethrough.

To further reduce gaps that might compromise the low pressure maintenance in the chamber 32, a series of deflectable flaps 238 cooperatively span the width of the gap G and are normally biased to cooperatively block the gap G. Advancing heavy debris will pivot the flaps 238 against a biasing force to allow movement of such debris out of the processing path for delivery to the auxiliary conveyor 26c.

Repositionable access doors 240, 242 are provided at the front of the housing 34 with a separate repositionable access door 244 provided on the extension 234.

Figure 3A:
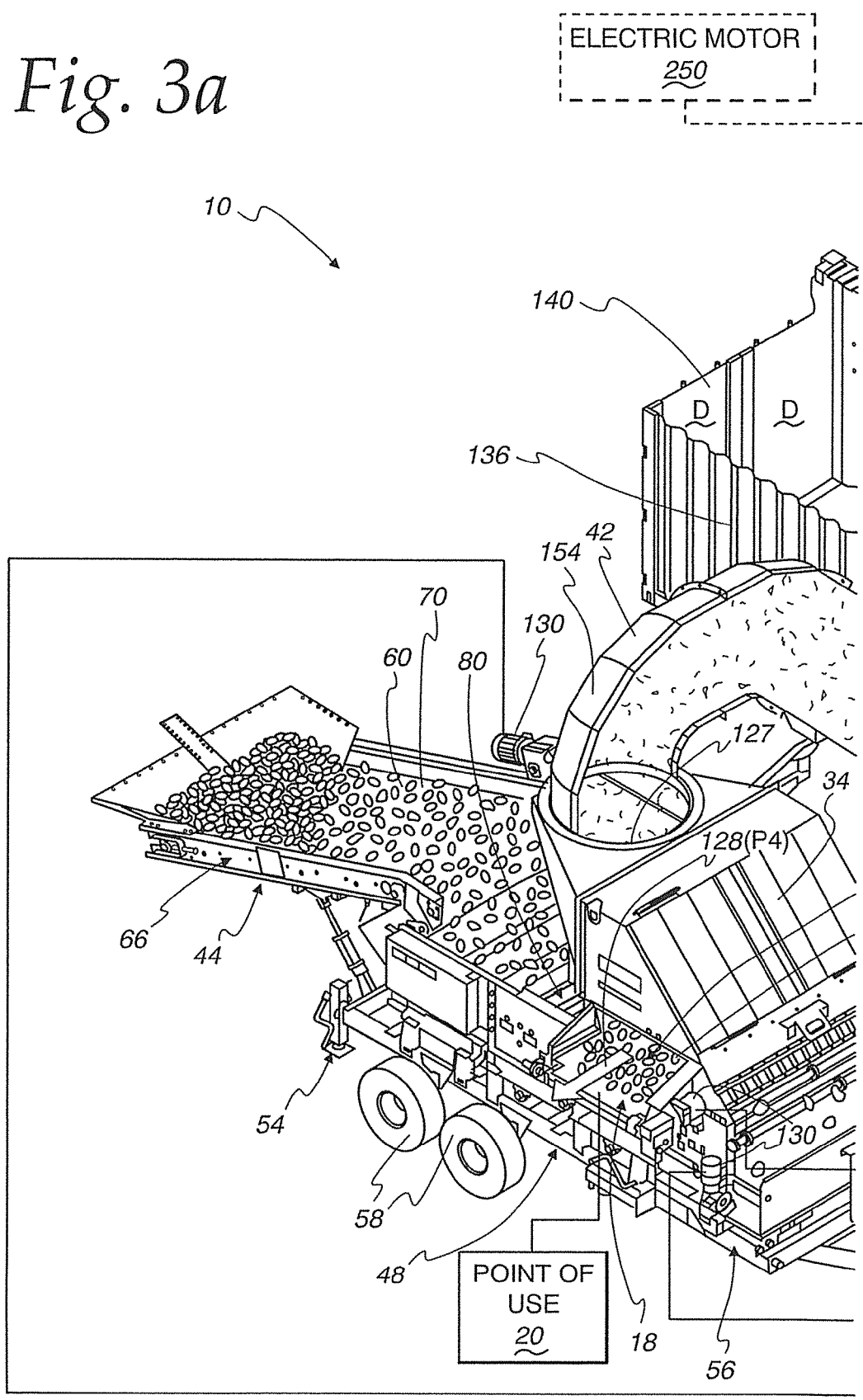
FIG. 3 is an enlarged, perspective view of the apparatus/system in FIG. 2 with components therein in an assembled state.
Figure 3B:
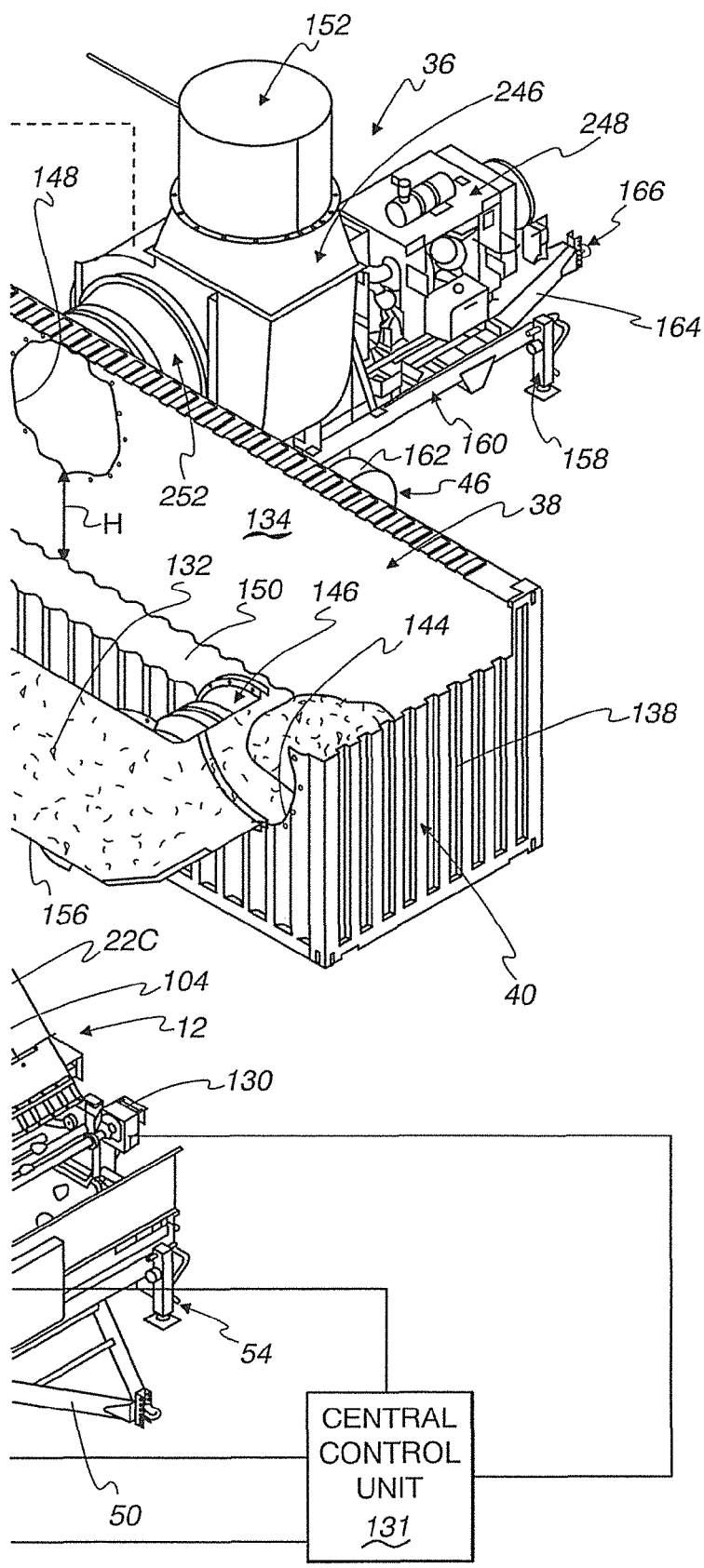

The evacuating system 36 in FIG. 3 is shown with a fan unit at 246 operated by a fuel powered engine 248, such as a diesel engine that may be operably connected to the fan unit 246 by conventional components such as an hydraulic clutch, sheaves, belts, etc. (not shown). An electric motor 250 might alternatively be used. An isolation sleeve 252 (FIG. 3) is used to connect to the collection container 40 to reduce any migrating vibration.

Figure 19:
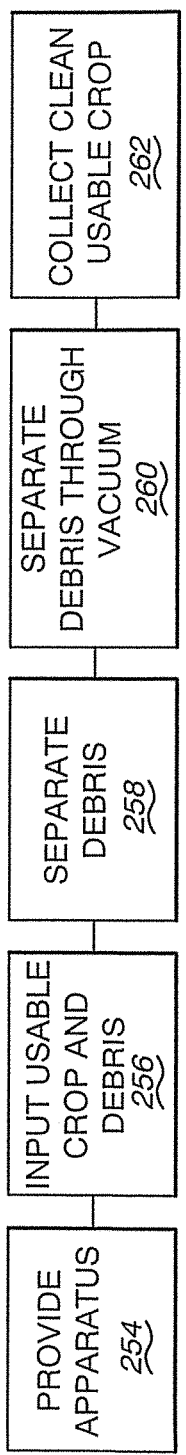
FIG. 19 is a flow diagram representation of a method for separating usable crop from intermixed debris according to the invention.

In FIG. 19, there is a flow diagram representation of a method of separating usable crop from intermixed debris, using an apparatus as described above.

As shown at block 254, an apparatus as described above is provided.

As shown at block 256, usable crop intermixed with debris is placed at an input location on a conveying system to be conveyed in a processing path.

As shown at block 258, through a first separating system, certain debris is separated from usable crop.

As shown at block 260, through a vacuum system, additional debris is separated from usable crop.

As shown at block 262, usable crop with removed debris is collected.

The foregoing disclosure of specific embodiments is intended to be illustrative of the broad concepts comprehended by the invention.

The invention claimed is:

1. An apparatus for separating usable crop from intermixed debris, the apparatus comprising:
    a conveying system configured to convey usable crop in a processing path from an upstream input location to a downstream output location,
    a first separating system configured to cause separation of debris intermixed with usable crop in a first manner as usable crop is conveyed in the processing path;
    a second separating system spaced along the processing path from the first separating system and configured to cause separation of debris intermixed with usable crop in a second manner that is different than the first manner,
    the conveying system comprising an upwardly facing conveying surface that supports usable crop and moves to advance supported usable crop along a portion of the processing path; and
    a vacuum system downstream of the first and second separating systems and configured to: a) generate a low pressure volume which causes additional debris intermixed with usable crop to be drawn away from usable crop by vacuum; b) cause drawn debris to be directed towards a collection location spaced from the output location while allowing usable crop to advance toward the output location; and c) cause usable crop supported on the conveying surface to be drawn upwardly off of and away from the conveying surface to move in another portion of the processing path,
    wherein the vacuum system comprises a housing defining a chamber through which the processing path extends, and in which the low pressure volume is generated, the housing defining an inlet through which the processing path extends.

2. The apparatus for separating usable crop from intermixed debris according to claim 1 wherein the conveying system comprises a plurality of cooperating, independently operating, conveying sections.

3. The apparatus for separating usable crop from intermixed debris according to claim 1 wherein one of the separating systems comprises a plurality of cooperating shafts, each with radially projecting fingers, that rotate around axes substantially normal to the conveying path, the shafts and fingers configured to: a) break loose debris intermixed with conveying usable crop; and b) permit travel of broken loose debris downwardly to between the shafts and out of the processing path.

4. The apparatus for separating usable crop from intermixed debris according to claim 3 wherein the apparatus further comprises an auxiliary conveyor configured to intercept downwardly traveling debris and convey intercepted downwardly traveling debris towards a collection location.

5. The apparatus for separating usable crop from intermixed debris according to claim 1 wherein one of the separating systems comprises a reconfigurable conveying section, the reconfigurable conveying section comprising an endless conveying component moving around roller support assemblies so as to define the upwardly facing conveying surface, at least one of the roller support assemblies configured to move in response to the application of a predetermined downward force applied upon the upwardly facing conveying surface as an incident of which an orientation of at least a portion of the upwardly facing surface is changed.

6. The apparatus for separating usable crop from intermixed debris according to claim 5 wherein the reconfigurable conveying section has: a) a first state that is maintained without a downward force equal to or greater than the predetermined downward force applied to the endless conveying component; and b) a second state in which the at least one roller support is moved in response to the application of the predetermined downward force to the endless conveying component.

7. The apparatus for separating usable crop from intermixed debris according to claim 1 wherein the conveying system comprises a plurality of cooperating, independently operating, conveying sections and one of the conveying sections is configured to cause debris to be conveyed out of the processing path towards a collection location.

8. The apparatus for separating usable crop from intermixed debris according to claim 1 wherein the conveying system comprises a plurality of cooperating, independently operating, conveying sections and one of the conveying sections and vacuum system are configured so that usable crop is drawn by vacuum generated at the housing inlet away from an upwardly facing conveying surface on the one conveying section and through the housing inlet and into the chamber.

9. The apparatus for separating usable crop from intermixed debris according to claim 8 wherein the one conveying section is configured so that the upwardly facing conveying surface on the one conveying section inclines at an angle towards the housing inlet.

10. The apparatus for separating usable crop from intermixed debris according to claim 9 wherein the one conveying section is configured so that the angle of incline can be changed.

11. The apparatus for separating usable crop according to claim 9 wherein the one conveying section is configured so that a relationship between the upwardly facing conveying surface and the housing inlet can be changed.

12. The apparatus for separating usable crop from intermixed debris according to claim 1 wherein the vacuum system comprises an evacuating system that is operable to create the low pressure volume in the housing chamber and a collection container is provided between the evacuating system and the housing volume, the collection container having a space within which low pressure is generated by the evacuating system, the low pressure in the collection container space causing debris separated from usable crop in the housing chamber to move into the collection container space.

13. The apparatus for separating usable crop from intermixed debris according to claim 12 wherein the vacuum system further comprises a conduit that is configured so that debris moving from the housing chamber into the collection container space travels downwardly towards the collection container space.

14. The apparatus for separating usable crop from intermixed debris according to claim 12 wherein the evacuating system is configured to be separable from the collection container and the evacuating system is supported on a wheeled carriage to facilitate transportation to and from a site at which the apparatus is used.

15. The apparatus for separating usable crop from intermixed debris according to claim 1 wherein the first and second separating systems and housing make up a unit that is supported on a wheeled carriage to facilitate transportation to and from a site at which the apparatus is used.

16. The apparatus for separating usable crop from intermixed debris according to claim 1 wherein the housing has a top opening, the vacuum system comprising an evacuation system that is in communication with the top opening and the housing has a wall surface bounding the chamber that is inclined between the housing inlet and the top opening.

17. The apparatus for separating usable crop from intermixed debris according to claim 1 wherein the housing has a top opening, the vacuum system comprising an evacuation system that is in communication with the top opening and the housing has a wall surface bounding the chamber that converges to the top opening.

18. A method of separating usable crop from intermixed debris, the method comprising the steps of:
providing the apparatus of claim 1;
placing usable crop intermixed with debris comprising dirt, vines, and rocks on the conveying system at the input location, so that the usable crop intermixed with debris is conveyed in the processing path;
through the first separating system, separating certain debris from the usable crop;
through the vacuum system separating additional debris from the usable crop and directing the additional debris to a separate container in which the additional debris is accumulated; and
collecting the usable crop after the additional debris has been separated.

19. The method of separating usable crop from intermixed debris according to claim 18 wherein the step of separating certain debris comprises separating large debris at a first location in the processing path by advancing the large debris off of an end of a conveyor and out of the processing path and separating other debris at a second location in the processing path spaced from the first location.

20. The method of separating usable crop from intermixed debris according to claim 18 further comprising the step of using an evacuating system in the vacuum system to generate the low pressure volume by evacuating the container space and space within a conduit communicating between the container space and housing volume.

21. The method of separating usable crop from intermixed debris according to claim 18 wherein the apparatus comprises first and second conveying sections that advance usable crop in the processing path in different directions and further comprising the step of using the vacuum system to cause crop advancing in the processing path to move from the first conveying section to the second conveying section.

22. The apparatus for separating usable crop from intermixed debris according to claim 1 wherein the apparatus is configured to cause usable crop to move in substantially opposite directions on the portion and the another portion of the processing path.

23. An apparatus for separating usable crop from intermixed debris, the apparatus comprising:
a conveying system configured to convey usable crop in a processing path from an upstream input location to a downstream output location,
a first separating system configured to cause separation of debris intermixed with usable crop in a first manner as usable crop is conveyed in the processing path;
a second separating system spaced along the processing path from the first separating system and configured to cause separation of debris intermixed with usable crop in a second manner that is different than the first manner, the conveying system comprising an upwardly facing conveying surface that supports usable crop and moves to advance supported usable crop along a portion of the processing path; and a vacuum system downstream of the first and second separating systems and configured to: a) generate a low pressure volume which causes additional debris intermixed with usable crop to be drawn away from usable crop by vacuum; b) cause drawn debris to be directed towards a collection location spaced from the output location while allowing usable crop to advance toward the output location; and c) cause usable crop supported on the conveying surface to be drawn upwardly away from the conveying surface to move in another portion of the processing path, wherein the vacuum system comprises an evacuating system that is operable to create the low pressure volume in the housing chamber and a collection container is provided between the evacuating system and the housing volume, the collection container having a space within which low pressure is generated by the evacuating system, the low pressure in the collection container space causing debris separated from usable crop in the housing chamber to move into the collection container space, wherein the collection container has spaced first and second openings, the first opening receiving debris from the housing chamber, the second opening in communication with the evacuating system, the collection container having a floor upon which debris is progressively accumulated and the first and second openings each is spaced above the floor so that a substantial height of debris can be accumulated upon the floor without obstructing the first or second openings.

24. An apparatus for separating usable crop from intermixed debris, the apparatus comprising:

a conveying system configured to convey usable crop in a processing path from an upstream input location to a downstream output location and comprising a conveying section, a first separating system configured to cause separation of debris intermixed with usable crop as usable crop is conveyed in the processing path; and a vacuum system downstream of the first separating system and configured to: a) generate a low pressure volume which causes additional debris intermixed with usable crop to be drawn away from usable crop by vacuum; and b) cause drawn debris to be directed towards a collection location spaced from the output location while allowing usable crop to advance toward the output location, wherein the vacuum system comprises a housing defining a chamber through which the processing path extends, and in which the low pressure volume is generated, the housing defining an inlet to the chamber, the conveying section and vacuum system configured so that usable crop is drawn by vacuum generated at the housing inlet away from an upwardly facing conveying surface on the conveying section and through the housing inlet and into the chamber, wherein the vacuum system further comprises an evacuating system that is operable to create the low pressure volume in the housing chamber and a collection container is provided between the evacuating system and the housing volume, the collection container having a space within which low pressure is generated by the evacuating system, the low pressure in the collection container space causing debris separated from usable crop in the housing chamber to move into the collection container space.

25. An apparatus for separating usable crop from intermixed debris, the apparatus comprising:

a conveying system configured to convey usable crop in a processing path from an upstream input location to a downstream output location and comprising a conveying section, a first separating system configured to cause separation of debris intermixed with usable crop as usable crop is conveyed in the processing path; and a vacuum system downstream of the first separating system and configured to: a) generate a low pressure volume which causes additional debris intermixed with usable crop to be drawn away from usable crop by vacuum; and b) cause drawn debris to be directed towards a collection location spaced from the output location while allowing usable crop to advance toward the output location, wherein the vacuum system comprises a housing defining a chamber through which the processing path extends, and in which the low pressure volume is generated, the housing defining an inlet to the chamber, the conveying section and vacuum system configured so that usable crop is drawn by vacuum generated at the housing inlet away from an upwardly facing conveying surface on the conveying section and through the housing inlet and into the chamber, wherein the vacuum system further comprises an evacuating system that is operable to create the low pressure volume in the housing chamber and a collection container is provided between the evacuating system and the housing volume, the collection container having a space within which low pressure is generated by the evacuating system, the low pressure in the collection container space causing debris separated from usable crop in the housing chamber to move into the collection container space, wherein the collection container has spaced first and second openings, the first opening receiving debris from the housing chamber, the second opening in communication with the evacuating system, the collection container having a floor upon which debris is progressively accumulated and the first and second openings each is spaced above the floor so that a substantial height of debris can be accumulated upon the floor without obstructing the first or second openings.

\* \* \* \* \*